United States Patent
Yamada et al.

(10) Patent No.: US 10,326,324 B2
(45) Date of Patent: Jun. 18, 2019

(54) ROTOR AND MOTOR

(71) Applicant: ASMO CO., LTD., Shizuoka-ken (JP)

(72) Inventors: Yoji Yamada, Hamamatsu (JP); Koji Mikami, Kosai (JP)

(73) Assignee: DENSO CORPORATION, Kariya, Aichi-Pref (JP)

( * ) Notice: Subject to any disclaimer, the term of this patent is extended or adjusted under 35 U.S.C. 154(b) by 0 days.

(21) Appl. No.: 15/822,048

(22) Filed: Nov. 24, 2017

(65) Prior Publication Data

US 2018/0076677 A1    Mar. 15, 2018

Related U.S. Application Data

(63) Continuation of application No. 14/158,273, filed on Jan. 17, 2014, now Pat. No. 9,859,761.

(30) Foreign Application Priority Data

Feb. 12, 2013 (JP) .................................. 2013-024710
Feb. 22, 2013 (JP) .................................. 2013-033007

(Continued)

(51) Int. Cl.
  *H02K 1/27* (2006.01)
  *H02K 1/24* (2006.01)
  *H02K 1/22* (2006.01)

(52) U.S. Cl.
  CPC ......... *H02K 1/2713* (2013.01); *H02K 1/2706* (2013.01); *H02K 1/226* (2013.01);
  (Continued)

(58) Field of Classification Search
  CPC .......... H02K 1/243; H02K 1/27; H02K 1/276; H02K 1/2766; H02K 1/2733; H02K 21/048; H02K 1/226
  (Continued)

(56) References Cited

U.S. PATENT DOCUMENTS

| 4,914,334 A | 4/1990 | Aso |
| 5,109,172 A * | 4/1992 | Pace ...................... H02K 23/04 |
| | | 310/154.43 |

(Continued)

FOREIGN PATENT DOCUMENTS

| CN | 101667759 A | 3/2010 |
| CN | 102832727 A | 12/2012 |

(Continued)

OTHER PUBLICATIONS

WO 2012067223 A1 (English Translation).*
(Continued)

*Primary Examiner* — Quyen P Leung
*Assistant Examiner* — Alexander Moraza
(74) *Attorney, Agent, or Firm* — Christensen, Fonder, Dardi & Herbert PLLC

(57) ABSTRACT

A rotor includes a first rotor core, a second rotor core, a permanent magnet and a resin layer. The first rotor core includes a first core base and first claw-shaped magnetic poles arranged at equal intervals on a peripheral portion of the first core base. The second rotor core includes a second core base and second claw-shaped magnetic poles arranged at equal intervals on a peripheral portion of the second core base. The first rotor core and the second rotor core are combined with each other so that the first and second core bases are opposed to each other and the first and second claw-shaped magnetic poles are alternately arranged in the circumferential direction of the rotor. The permanent magnet includes at least a main field magnet. The main field magnet is located between the first and second core bases in the axial direction, and is magnetized in the axial direction. The main field magnet causes the first claw-shaped magnetic poles to function as first magnetic poles, and causes the second claw-shaped magnetic poles to function as second magnetic (Continued)

poles. The resin layer covers at least a portion of a surface of the permanent magnet.

5 Claims, 32 Drawing Sheets

(30) Foreign Application Priority Data

| | | | |
|---|---|---|---|
| Feb. 22, 2013 | (JP) | ................................ | 2013-033008 |
| Oct. 3, 2013 | (JP) | ................................ | 2013-208493 |
| Oct. 29, 2013 | (JP) | ................................ | 2013-224595 |

(52) U.S. Cl.
CPC ............. *H02K 1/243* (2013.01); *H02K 1/274* (2013.01); *H02K 1/276* (2013.01); *H02K 1/2733* (2013.01); *H02K 1/2753* (2013.01); *H02K 1/2773* (2013.01)

(58) Field of Classification Search
USPC ..... 310/156.66–156.73, 263, 156.36–156.37
See application file for complete search history.

(56) References Cited

U.S. PATENT DOCUMENTS

| | | | |
|---|---|---|---|
| 5,793,144 A | 8/1998 | Kusase et al. | |
| 5,854,526 A | 12/1998 | Sakamoto | |
| 5,903,084 A | 5/1999 | Asao et al. | |
| 6,034,464 A | 3/2000 | Asao | |
| 6,268,060 B1 | 7/2001 | Mokerji | |
| 6,445,096 B1 | 9/2002 | Saito et al. | |
| 6,762,527 B1 | 7/2004 | Horng | |
| 6,968,069 B1 | 11/2005 | Zhao | |
| 2002/0011757 A1 | 1/2002 | Tanaka et al. | |
| 2003/0030345 A1 | 2/2003 | Enomoto et al. | |
| 2004/0051415 A1* | 3/2004 | Hamamura | H02K 1/278 310/156.28 |
| 2005/0052087 A1* | 3/2005 | Shinmura | F16H 57/025 310/89 |
| 2005/0156480 A1 | 7/2005 | Imai et al. | |
| 2006/0091743 A1 | 5/2006 | Iwasaki et al. | |
| 2007/0194648 A1* | 8/2007 | Evans | H02K 1/2733 310/156.16 |
| 2010/0109466 A1* | 5/2010 | Kondo | H02K 21/044 310/156.12 |
| 2010/0127403 A1 | 5/2010 | Muta | |
| 2010/0330361 A1* | 12/2010 | Yoshida | B32B 15/015 428/336 |
| 2011/0234348 A1* | 9/2011 | Miwa | C22C 38/002 335/302 |
| 2013/0057102 A1 | 3/2013 | Yamada et al. | |
| 2013/0106208 A1 | 5/2013 | Yamada et al. | |
| 2013/0121856 A1 | 5/2013 | Yamada et al. | |
| 2013/0241340 A1* | 9/2013 | Koga | H02K 1/2773 310/156.56 |
| 2013/0300242 A1 | 11/2013 | Yamada et al. | |

FOREIGN PATENT DOCUMENTS

| | | | | |
|---|---|---|---|---|
| FR | 2786956 A1 * | 6/2000 | ........... | H02K 1/2706 |
| JP | S58-022884 U | 2/1983 | | |
| JP | 59163806 A * | 9/1984 | ........... | H01F 41/026 |
| JP | S63-004169 U | 1/1988 | | |
| JP | 5-43749 U | 6/1993 | | |
| JP | H06-105490 A | 4/1994 | | |
| JP | 3014309 U | 5/1995 | | |
| JP | H08-242572 A | 9/1996 | | |
| JP | H11-136913 A | 5/1999 | | |
| JP | 2000-032719 A | 1/2000 | | |
| JP | 2004-040895 A | 2/2004 | | |
| JP | 2004040895 A * | 2/2004 | | |
| JP | 2010-183694 A | 8/2010 | | |
| JP | WO 2012067223 A1 * | 5/2012 | ........... | H02K 21/044 |
| JP | 2012-115085 A | 6/2012 | | |
| JP | 2012213310 A * | 11/2012 | ............. | H02K 1/276 |
| JP | 2013-099105 A | 5/2013 | | |
| JP | 2013-118801 A | 6/2013 | | |
| WO | WO 2012/067223 A1 | 5/2012 | | |

OTHER PUBLICATIONS

JP 59163806 A (English Translation).*
FR 2786956 A1 (English Translation).*
JP 2012213310 A (English Translation).*
JP 2004040895 A (English Translation).*

* cited by examiner

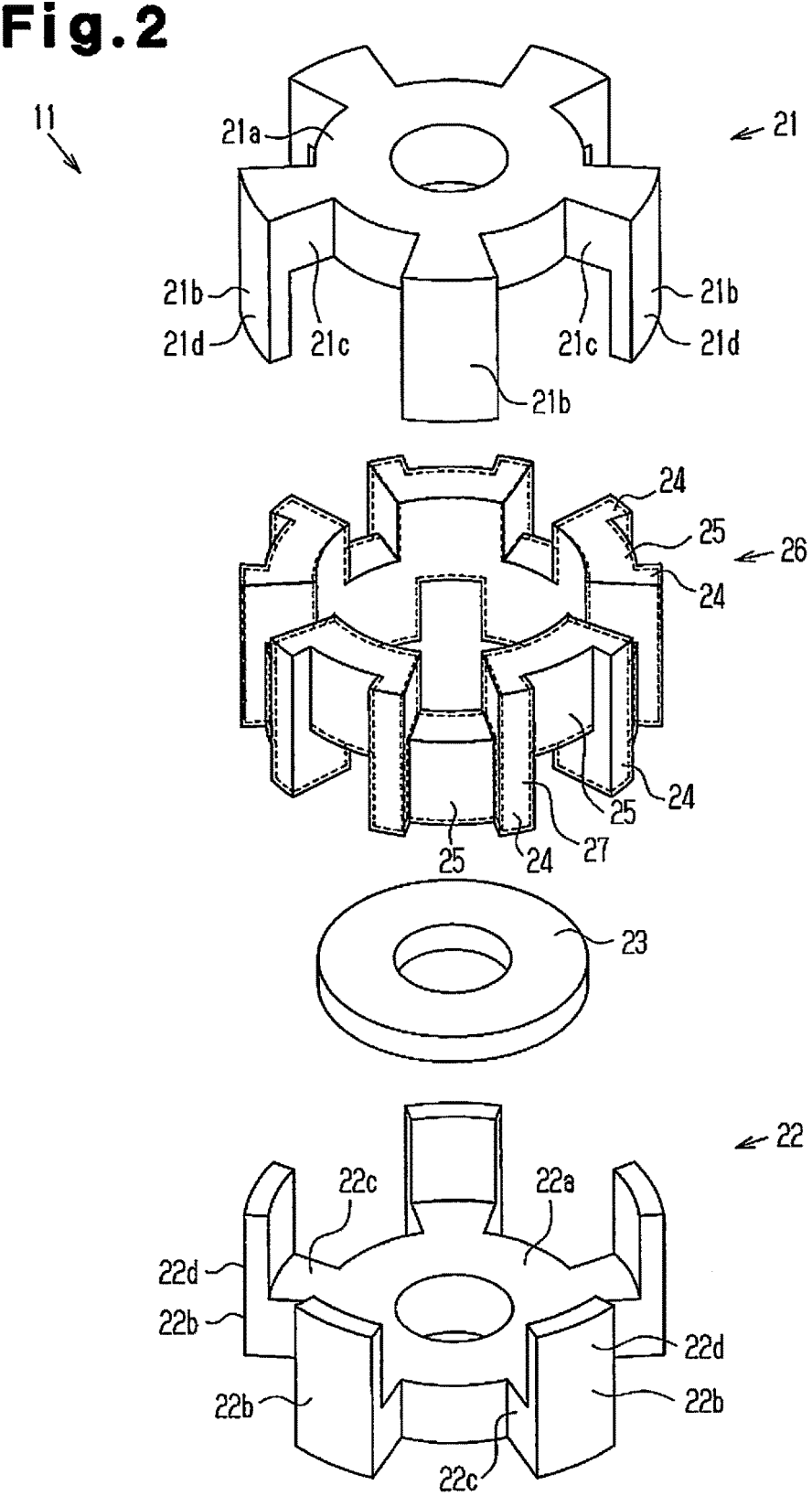

Fig.7
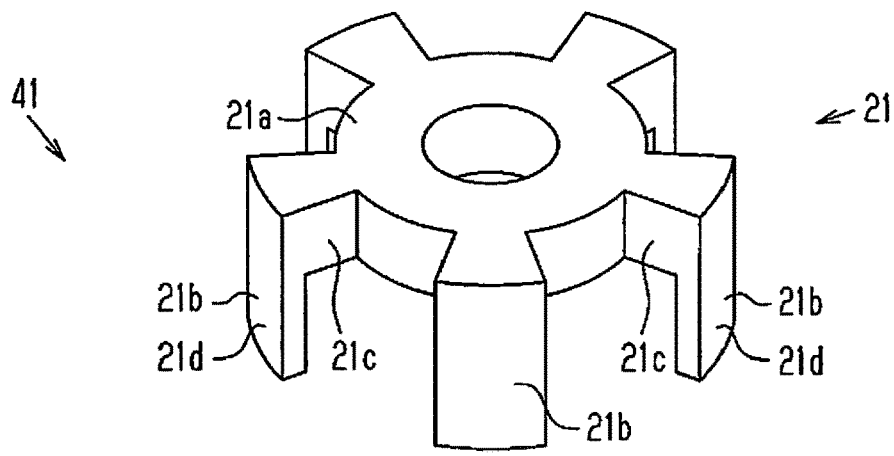
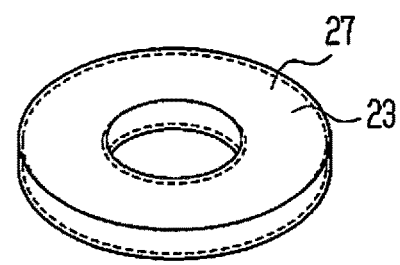
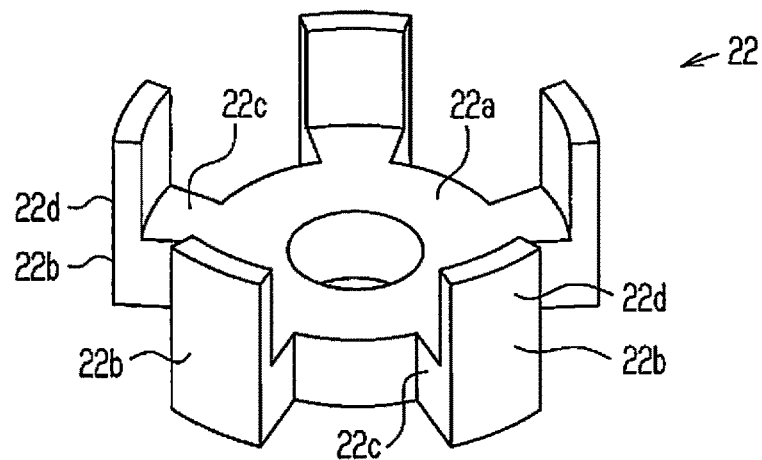

Fig.15
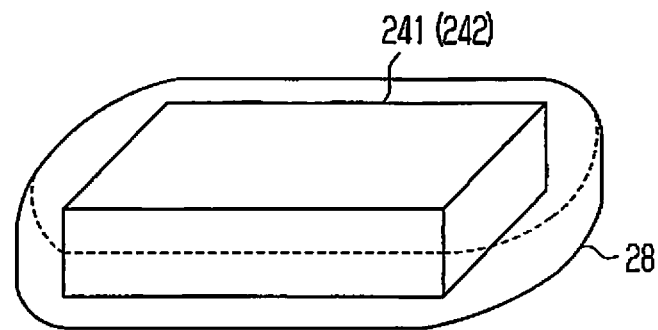
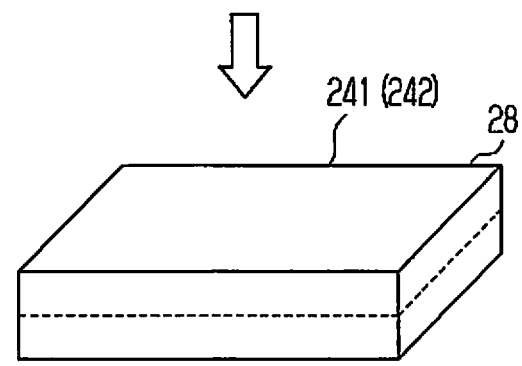
Fig.16
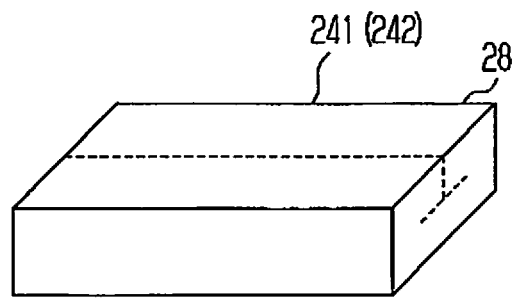

ROTOR AND MOTOR

CROSS-REFERENCE TO RELATED APPLICATIONS

The present application is a continuation application of U.S. patent application Ser. No. 14/158,273, filed Jan. 17, 2014, which claims priority to Japanese Patent Application No. 2013-208493, filed Oct. 3, 2013, Japanese Patent Application No. 2013-024710, filed Feb. 12, 2013, Japanese Patent Application No. 2013-033008, filed Feb. 22, 2013, Japanese Patent Application No. 2013-224595, filed Oct. 29, 2013, and Japanese Patent Application No. 2013-033007, filed Feb. 22, 2013, the disclosures of which are hereby incorporated by reference herein in their entireties.

BACKGROUND OF THE PRESENT INVENTION

The present invention relates to a rotor and a motor.

A rotor having the so-called Lundell-type structure using a permanent magnet field is one type of a rotor for a motor. Such a rotor includes two rotor cores and a field magnet. Each of the rotor cores includes a plurality of claw-shaped magnetic poles arranged in the circumferential direction. The rotor cores are combined with each other so that the field magnet is located between the two rotor cores. This results in the claw-shaped magnetic poles alternately functioning as different magnetic poles.

Japanese Laid-Open Patent Publication No. 2012-115085 describes a rotor. Auxiliary magnets, such as interpolar magnets magnetized in the circumferential direction, are arranged between claw-shaped magnetic poles in the circumferential direction to reduce flux leakage in the rotor.

In this rotor, however, the field magnet and the auxiliary magnets, which are affected by the ambient environment, may be demagnetized or damaged.

It is an object of the present invention to provide a rotor and a motor capable of protecting permanent magnets and preventing deterioration in the performance of the permanent magnets.

To achieve the above object, one aspect of the present invention is a rotor including a first rotor core, a second rotor core, a permanent magnet, and a resin layer. The first rotor core includes a substantially disk-shaped first core base and a plurality of first claw-shaped magnetic poles arranged at equal intervals on a peripheral portion of the first core base. Each of the first claw-shaped magnetic poles projects outward in the radial direction and extends in the axial direction. The second rotor core includes a substantially disk-shaped second core base and a plurality of second claw-shaped magnetic poles arranged at equal intervals on a peripheral portion of the second core base. Each of the second claw-shaped magnetic poles projects outward in the radial direction and extends in the axial direction, and the first rotor core and the second rotor core are combined with each other so that the first and second core bases are opposed to each other and the first and second claw-shaped magnetic poles are alternately arranged in the circumferential direction. The permanent magnet includes at least a main field magnet. The main field magnet is located between the first and second core bases in the axial direction and is magnetized in the axial direction, and the main field magnet causes the first claw-shaped magnetic poles to function as first magnetic poles and causes the second claw-shaped magnetic poles to function as second magnetic poles. The resin layer covers at least a portion of a surface of the permanent magnet.

A second aspect of the present invention is a rotor including a first rotor core, a second rotor core, a field magnet, and an auxiliary magnet. The first rotor core includes a first core base and a plurality of first claw-shaped magnetic poles arranged at equal intervals on a peripheral portion of the first core base. The first claw-shaped magnetic poles project outward in the radial direction and extend in the axial direction. The second rotor core includes a second core base and a plurality of second claw-shaped magnetic poles arranged at equal intervals on a peripheral portion of the second core base. The second claw-shaped magnetic poles project outward in the radial direction and extend in the axial direction, and the first rotor core and the second rotor core are combined with each other so that the first and second core bases are opposed to each other and the first and second claw-shaped magnetic poles are alternately arranged in the circumferential direction. The field magnet is located between the first and second core bases in the axial direction and magnetized in the axial direction. The field magnet causes the first claw-shaped magnetic poles to function as first magnetic poles and causes the second claw-shaped magnetic poles to function as second magnetic poles. The auxiliary magnet is formed by at least one of a back surface magnet and an interpolar magnet. The back surface magnet is located between the field magnet and a corresponding one of the first and second claw-shaped magnetic poles to limit flux leakage therebetween, and the interpolar magnet is located between adjacent ones of the first and second claw-shaped magnetic poles in the circumferential direction to limit flux leakage therebetween. At least one of the field magnet and the auxiliary magnet includes a non-abutment portion that partially blocks abutment between the field magnet and the auxiliary magnet.

A third aspect of the present invention is a rotor including a first rotor core, a second rotor core, and a field magnet. The first rotor core includes a substantially disk-shaped first core base and a plurality of first claw-shaped magnetic poles arranged at equal intervals on a peripheral portion of the first core base. Each of the first claw-shaped magnetic poles projects outward in the radial direction and extends in the axial direction. The second rotor core includes a substantially disk-shaped second core base and a plurality of second claw-shaped magnetic poles arranged at equal intervals on a peripheral portion of the second core base. Each of the second claw-shaped magnetic poles projects outward in the radial direction and extends in the axial direction, and the first rotor core and the second rotor core are combined with each other so that the first and second core bases are opposed to each other and the first and second claw-shaped magnetic poles are alternately arranged in the circumferential direction. The field magnet is located between the first and second core bases in the axial direction and magnetized in the axial direction so that the first claw-shaped magnetic poles function as first magnetic poles and the second claw-shaped magnetic poles function as second magnetic poles. The field magnet includes two side surfaces in the axial direction. At least one of the two side surfaces includes a dividing groove that is recessed in the axial direction and extends in the radial direction.

BRIEF DESCRIPTION OF THE DRAWINGS

The invention, together with objects and advantages thereof, may best be understood by reference to the following description of the presently preferred embodiments together with the accompanying drawings in which:

FIG. 2 is an exploded perspective view of a rotor shown in FIG. 1;

FIG. 7 is an exploded perspective view of the rotor shown in FIGS. 6A and 6B;

FIG. 15 is a schematic diagram illustrating a heat-shrinkable film in another example of the second embodiment;

FIG. 16 is a schematic diagram illustrating a heat-shrinkable film in another example of the second embodiment;

DETAILED DESCRIPTION OF PREFERRED EMBODIMENTS

One embodiment of a motor will now be described with reference to FIGS. 1 to 5.

Figure 1:
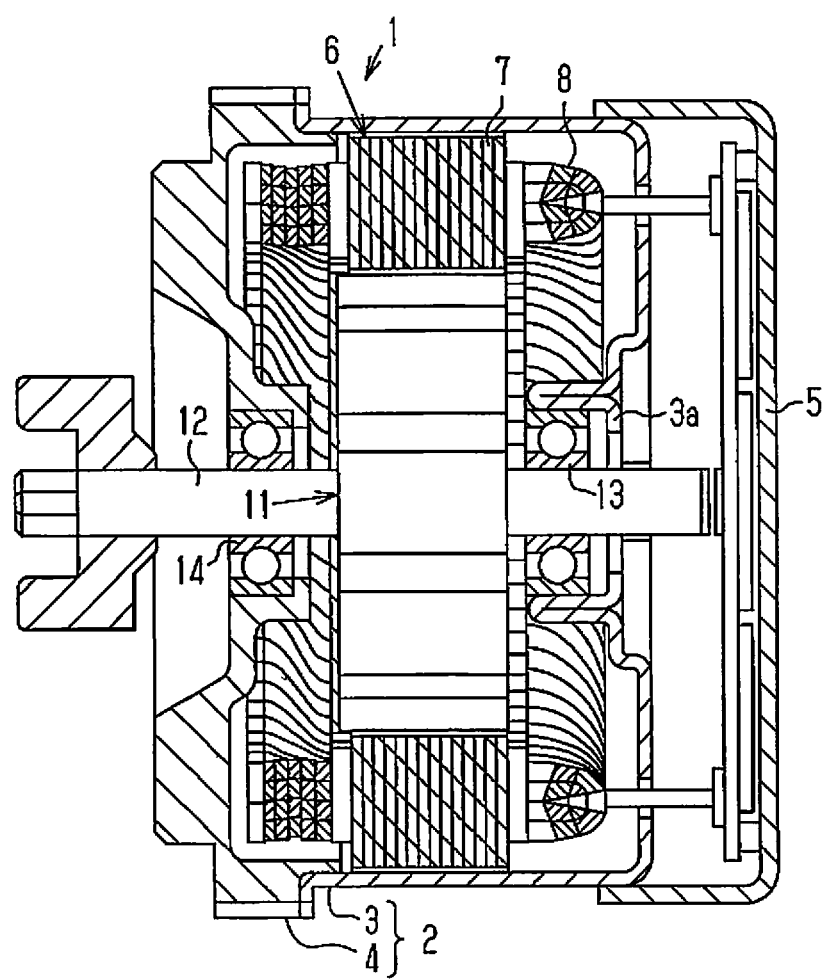
FIG. 1 is a cross-sectional view of a motor according to a first embodiment of the present invention.
Figure 3A:
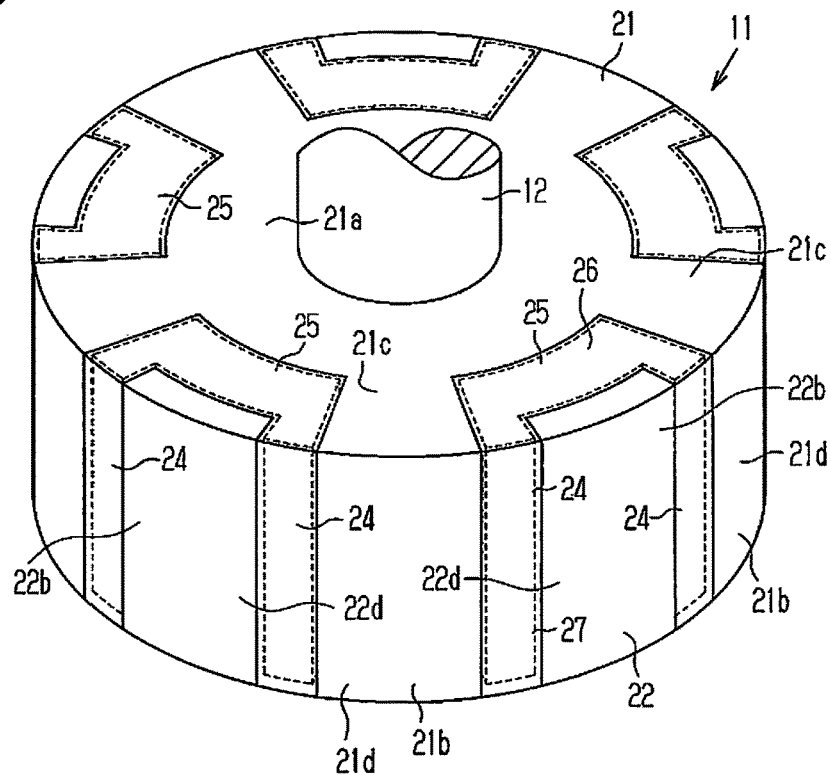
FIGS. 3A and 3B are perspective views of the rotor shown in FIG. 2.
Figure 3B:
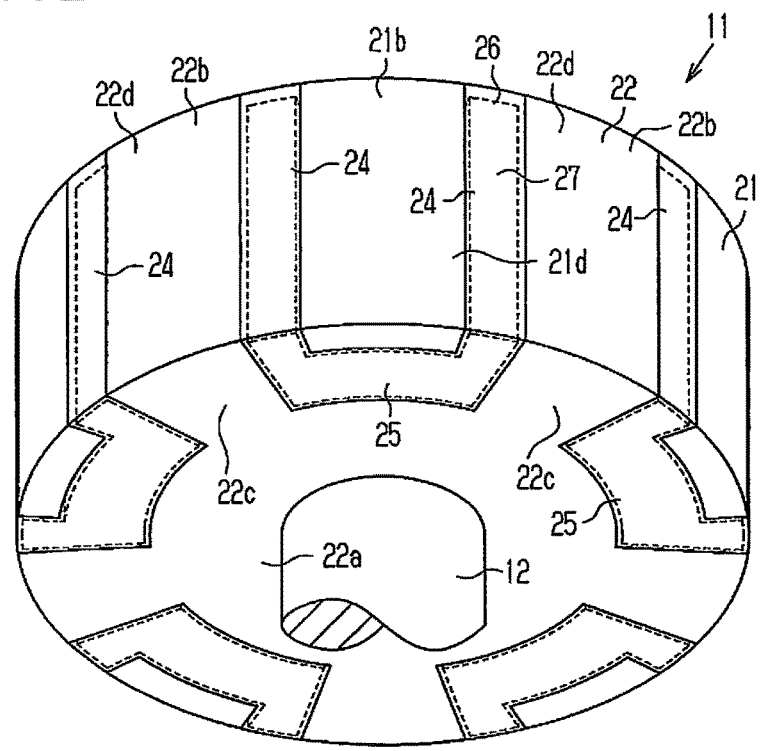

As shown in FIG. 1, a motor case 2 of a motor 1 includes a cylindrical housing 3, which is cylindrical and has a closed end, and a front end plate 4, which closes the opening at the front side (left side in FIG. 1) of the cylindrical housing 3. A circuit accommodation box 5 is attached to the end at the rear side (right side in FIG. 1) of the cylindrical housing 3 to accommodate a power supply circuit such as a circuit substrate.

A stator 6 is fixed to an inner circumferential surface of the cylindrical housing 3. The stator 6 includes an armature core 7 having a plurality of teeth extending radially inward and segment conductor (SC) winding 8 wound around the teeth of the armature core 7.

A rotor 11 of the motor 1 includes a rotation shaft 12 and is arranged at the inner side of the stator 6. The rotation shaft 12 is a non-magnetic metal shaft and is rotatably supported by bearings 13 and 14 which are supported by an end 3*a* of the cylindrical housing 3 and the front end plate 4.

As shown in FIGS. 2, 3A, 3B and 4, the rotor 11 includes first and second rotor cores 21 and 22, an annular magnet 23 (see FIGS. 2 and 4) serving as a main field magnet, and an interpolar back surface magnet 26, in which interpolar magnets 24 and back surface magnets 25 are integrally formed.

The first rotor core 21 includes a first core base 21*a* serving as a substantially disk-shaped core base, and a plurality of (five in this embodiment) first claw-shaped magnetic poles 21*b* serving as claw-shaped magnetic poles arranged at equal intervals on a peripheral portion of the first core base 21*a*. Each of the first claw-shaped magnetic poles 21*b* projects radially outward and extends in the axial direction. More specifically, each of the first claw-shaped magnetic poles 21*b* includes a projection 21*c* projecting radially outward from the peripheral portion of the first core base 21*a*, and a claw 21*d* arranged on a distal end of the projection 21*c* and extending in the axial direction. The projection 21*c* has the form of a sector as viewed in the axial direction. The claw 21*d* has a sector cross-section that is orthogonal to the axial direction and is rectangular as viewed from the radially outer side.

Figure 4:
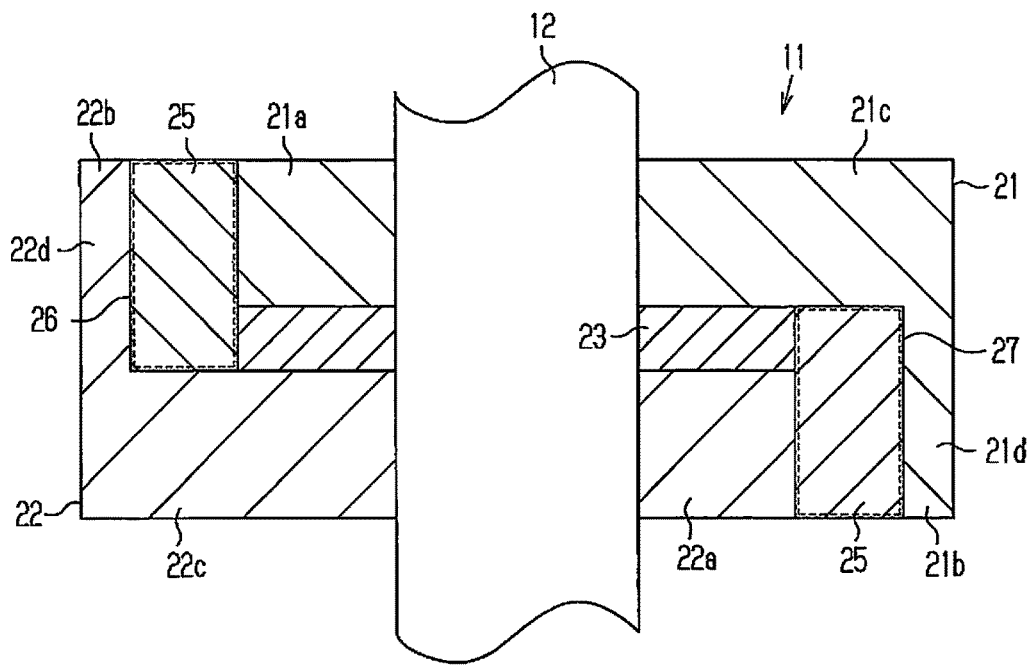
FIG. 4 is a cross-sectional view of the rotor shown in FIGS. 3A and 3B.

The second rotor core 22, which has the same shape as the first rotor core 21, includes a second core base 22*a* serving as a substantially disk-shaped core base, and a plurality of (five in the first embodiment) second claw-shaped magnetic poles 22*b* serving as claw-shaped magnetic poles arranged at equal intervals on a peripheral portion of the second core base 22*a*. Each of the second claw-shaped magnetic poles 22*b* projects radially outward and extends in the axial direction. More specifically, each of the second claw-shaped magnetic poles 22*b* includes a projection 22*c* projecting radially outward from the peripheral portion of the second core base 22*a*, and a claw 22*d* arranged on a distal end of the projection 22*c* and extending in the axial direction. The projection 22*c* has the form of a sector as viewed in the axial direction like the projection 21*c* of the first rotor core 21. The claw 22*d* has a sector cross-section that is orthogonal to the axial direction and is rectangular as viewed from the radially outer side. The second rotor core 22 is coupled to the first rotor core 21 so that each of the second claw-shaped magnetic poles 22*b* are located between the corresponding first claw-shaped magnetic poles 21*b* (i.e., second claw-shaped magnetic poles 22*b* and first claw-shaped magnetic poles 21*b* are arranged alternately in circumferential direction), and so that the annular magnet 23 is arranged between (sandwiched), in the axial direction, the first core base 21*a* and the second core base 22*a* which are opposed to each other as shown in FIG. 4. Here, rectangular grooves as viewed from the radially outer side are formed between the first claw-shaped magnetic poles 21*b* and the second claw-shaped magnetic poles 22*b* in the circumferential direction.

The outer diameter of the annular magnet 23 is set to equal to those of the first and second core bases 21*a* and 22*a*. The annular magnet 23 is magnetized in the axial direction so that the first claw-shaped magnetic poles 21*b* function as first magnetic poles (north poles in the first embodiment) and the second claw-shaped magnetic poles 22*b* function as second magnetic poles (south poles in the first embodiment).

The annular magnet 23 is a permanent magnet, more particularly, a ferrite sintered magnet.

Back surface magnets 25 of the interpolar back surface magnet 26 are located between back surfaces (radial inner surfaces) of the first claw-shaped magnetic poles 21*b* (claws 21*d*) and an outer circumferential surface of the second core base 22*a*, and between back surfaces (radial inner surfaces) of the second claw-shaped magnetic poles 22*b* (claws 22*d*) and the outer circumferential surface of the first core base 21*a*. Each of the back surface magnets 25 is substantially rectangular parallelepiped shape and has a sector cross-section orthogonal to the axial direction. Each of the back surface magnets 25 is magnetized in the radial direction to reduce flux leakage where the back surface magnet 25 is located. More specifically, a portion of the back surface magnet 25 that abuts against a back surface of the first claw-shaped magnetic pole 21*b* (claw 21*d*) is magnetized in the radial direction into the north pole, which is the same magnetic pole as the first claw-shaped magnetic pole 21*b*, and a portion of the back surface magnet 25 that abuts against the second core base 22*a* is magnetized in the radial direction into the south pole. A portion of the back surface magnet 25 that abuts against the back surface of the second claw-shaped magnetic pole 22*b* (claw 22*d*) is magnetized in the radial direction into the south pole, which is the same magnetic pole as the second claw-shaped magnetic pole 22*b*, and a portion of the back surface magnet 25 that abuts against the first core base 21*a* is magnetized in the radial direction into the north pole, which is the same magnetic pole as the first core base 21*a*.

As shown in FIG. 4, the back surface magnets 25 are arranged so that they are overlapped with each other in the axial direction at an axial position where the annular magnet 23 is located. In other words, the back surface magnet 25 is arranged also at the axial position where the annular magnet 23 is located.

The interpolar magnets 24 of the interpolar back surface magnet 26 are located between the first claw-shaped magnetic poles 21*b* and the second claw-shaped magnetic poles 22*b* in the circumferential direction. More specifically, the axial length of the interpolar magnet 24 in the first embodiment is set to be equal to the axial lengths of the first and second claw-shaped magnetic poles 21*b* and 22*b*. The interpolar magnet 24 is formed into a substantially rectangular parallelepiped shape having a sector cross-section orthogonal to the axial direction. A circumferential end surface of the interpolar magnet 24 is connected to a circumferential end surface of the back surface magnet 25. Thus, the interpolar magnet 24 and the back surface magnet 25 configure the annular interpolar back surface magnet 26.

Each of the interpolar magnets 24 is magnetized in the circumferential direction so that it has a portion having the same magnetic pole as the corresponding one of the first and second claw-shaped magnetic poles 21*b* and 22*b* (so that a portion of interpolar magnet 24 closer to first claw-shaped magnetic pole 21*b* is the north pole and a portion of interpolar magnet 24 closer to second claw-shaped magnetic pole 22*b* is the south pole). The interpolar back surface magnet 26 is a permanent magnet, that is, a rare-earth bond magnet, more particularly, a nylon bond magnet including neodymium powder.

Figure 5:
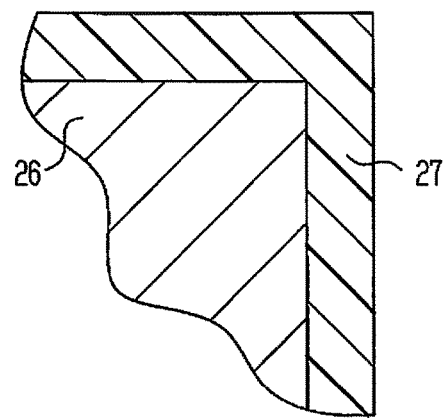
FIG. 5 is a partial schematic cross-sectional view of an interpolar back surface magnet shown in FIG. 4.

Here, as shown in FIG. 5, an entire surface of the interpolar back surface magnet 26 including a surface exposed to the outer side (not hidden by other members) is covered with a resin material 27. More specifically, the entire surface of the interpolar back surface magnet 26 exposed to the outer side from the first and second core bases 21a and 22a is coated with the resin material 27. In the first embodiment, the interpolar back surface magnet 26 exposed to the outer side from the first and second core bases 21a and 22a is located at the radially outer side of the first and second core bases 21a and 22a. The resin material 27 of the first embodiment is poly-para-xylylene. FIGS. 2 to 4, the broken lines schematically show the interpolar back surface magnet 26 before being coated with the resin material 27 (nylon bond magnet including neodymium powder) for easy recognition.

A manufacturing method of the rotor 11 include a chemical vapor deposition step that performs the coating of the resin material 27 through chemical vapor deposition, and the interpolar back surface magnet 26 is coated with the resin material 27 through the chemical vapor deposition. The annular magnet 23, which does not have a surface exposed to the outer side (is hidden by other members), is not coated.

Next, the operation of the motor 1 having the above-described configuration will be described.

If drive current is supplied to the segment conductor (SC) winding 8 of the stator 6, a rotating field is generated to rotate and drive the rotor 11. The back surface magnets 25 and the interpolar magnets 24 are arranged in the rotor 11. Therefore, flux leakage is reduced at locations where the back surface magnets 25 and the interpolar magnets 24 are arranged. Therefore, magnetic flux of the annular magnet 23 can be utilized for the output of the motor 1.

The advantages of the first embodiment will now be described.

(1) Since the surface of the interpolar back surface magnet 26, which is exposed to the outer side, is coated with the resin material 27, deterioration may be limited in the interpolar back surface magnet 26 that would be caused by moisture and rust, for example. This limits, for example, chipping and demagnetization of the interpolar back surface magnet 26.

(2) The surface of the interpolar back surface magnet 26, which is exposed to the outer side, is coated with the resin material 27. Hence, it is possible to limit flux leakage between the first claw-shaped magnetic pole 21b and the second claw-shaped magnetic pole 22b in the circumferential direction, and limit deterioration of the interpolar magnet 24.

(3) The surface of the back surface magnet 25 of the interpolar back surface magnet 26, which is exposed to the outer side, is coated with the resin material 27. Hence, it is possible to limit flux leakage between the first and second claw-shaped magnetic poles 21b and 22b in the radial direction, and limit deterioration of the back surface magnet 25.

(4) The interpolar magnets 24 and the back surface magnets 25 are integrally formed to configure the interpolar back surface magnet 26. As compared with a configuration in which the interpolar magnets 24 and the back surface magnets 25 are formed as discrete members, it is possible to reduce the number of parts.

(5) In the interpolar back surface magnet 26 (interpolar magnets 24 and back surface magnets 25), the entire surface is coated with the resin material 27, and not only the surface exposed to the outside. This limits damage of the interpolar back surface magnet 26 when hit against the first rotor core 21 or the second rotor core 22 during an assembling process, for example. The interpolar back surface magnet 26 and the annular magnet 23 abut against each other through the resin material 27, for example. Thus, they can be stably held (loosening is limited). Even when separate permanent magnets (interpolar back surface magnet 26 and annular magnet 23) are coupled together and then polarized for example, the resin material 27 located in between slightly separates the permanent magnets from each other. Hence, it is possible to restrain demagnetization near the boundary between the interpolar back surface magnet 26 and the annular magnet 23.

(6) Since the resin material 27 is poly-para-xylylene, it is possible to enhance heat resistance and moisture absorption resistance.

(7) The interpolar back surface magnet 26 is a rare-earth bond magnet (more specifically, nylon bond magnet including neodymium powder). If the interpolar back surface magnet 26 were not coated, it would easily absorb water and easily deteriorate. Since the interpolar back surface magnet 26 is coated with the resin material 27 in the first embodiment, it is possible to effectively limit deterioration of the interpolar back surface magnet 26.

(8) The manufacturing method of the rotor 11 includes the chemical vapor deposition step that performs coating with the resin material 27 through chemical vapor deposition. Thus, the interpolar back surface magnet 26 can be uniformly and easily coated with the resin material 27.

The first embodiment may be modified as described below.

Although the interpolar magnets 24 and the back surface magnets 25 are integrally formed to configure the interpolar back surface magnet 26 in the first embodiment, the present invention is not limited to this, and the interpolar magnets 24 and the back surface magnets 25 may be formed as separate magnets.

Figure 6A:
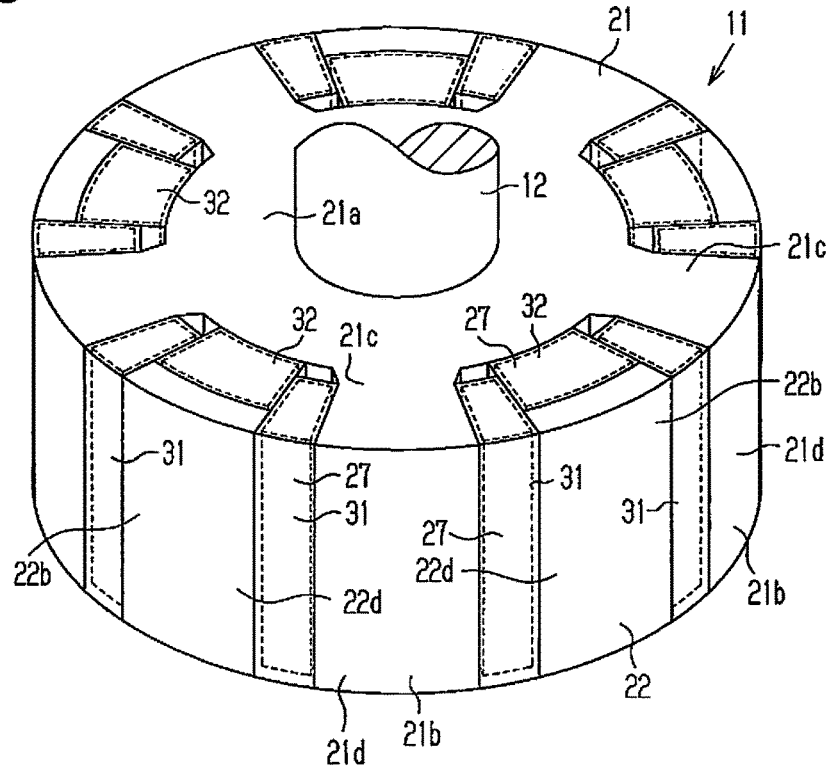
FIGS. 6A and 6B are perspective views of a rotor in another example of the first embodiment.
Figure 6B:
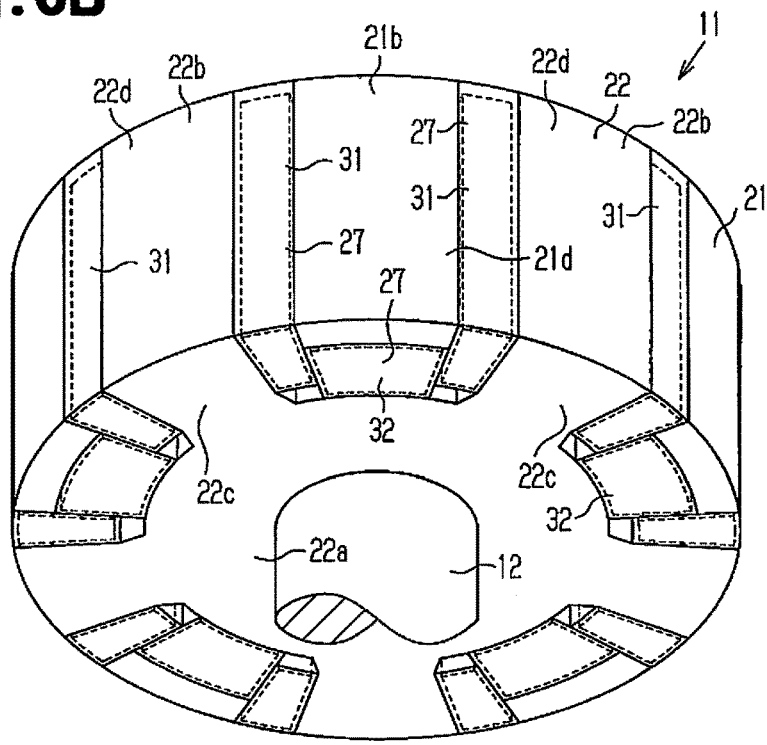

As shown in FIGS. 6A and 6B for example, interpolar magnets 31 and back surface magnets 32 may be formed as discrete members, and then separately coupled to the rotor 11. In this example, an entire surface of the interpolar magnets 31 and the back surface magnets 32, including their respective surfaces exposed to the outer side, is coated with the resin material 27. In FIG. 6, the interpolar magnets 31 and the back surface magnets 32 before coated with the resin material 27 are schematically shown by broken lines for easy recognition.

The annular magnet 23 may be integrally formed with the interpolar magnets 24 and the back surface magnets 25 (i.e., the interpolar back surface magnet 26). This further reduces the number of parts as compared with when the annular magnet 23 is formed as a discrete member (the configuration according to the first embodiment).

Although the rotor 11 includes the interpolar back surface magnet 26 (the interpolar magnets 24 and the back surface magnets 25), the present invention is not limited to this. For example, if the rotor 11 includes the annular magnet 23, the rotor 11 does not have to include the interpolar magnets 24 and the back surface magnets 25.

As shown in FIG. 7 for example, a rotor 41 may include only the annular magnet 23 and not include the interpolar magnets 24 and the back surface magnets 25. In this case, an outer circumferential surface of the annular magnet 23 is exposed to the outer side. More specifically, the outer circumferential surface of the annular magnet 23 is exposed to the outer side from the first and second core bases 21a and 22a. For this reason, an entire surface of the annular magnet 23, including a surface (outer circumferential surface) which is exposed to the outer side, is coated with the resin material 27 in this example. In FIG. 7, the annular magnet 23 before coated with the resin material 27 is schematically shown by broken lines for easy recognition. Thus, it is possible to avoid a case where the annular magnet 23 is deteriorated by moisture and rust.

In the first embodiment, in the interpolar back surface magnet 26 (interpolar magnets 24 and back surface magnets 25), the entire surface is coated with the resin material 27, not only the surface exposed to the outer side. However, there is no such limitation, and it is only necessary that at least a portion of the surface exposed to the outer side be coated with the resin material 27. For example, only a surface of the interpolar back surface magnet 26 exposed to the outer side may be coated with the resin material 27. When all of the first and second rotor cores 21 and 22, the annular magnet 23 and the interpolar back surface magnet 26 (interpolar magnets 24 and back surface magnets 25) are coupled together, all of their surfaces exposed to the outer side (including surfaces of first and second rotor cores 21 and 22) may be coated with the resin material 27.

Although not particularly mentioned in the first embodiment, in the permanent magnet (interpolar back surface magnet 26) of which surface exposed to the outer side is coated with the resin material 27, a surface of the permanent magnet opposed to the first and second rotor cores 21 and 22 may be coated with the resin material 27 (as multi-layer for example) more thickly than a surface of the permanent magnet exposed to the outer side.

Thus, it is possible to further limit damage if the permanent magnet (interpolar back surface magnet 26) hits the first or second rotor core 21 or 22 when coupled together.

Although the resin material 27 is poly-para-xylylene in the first embodiment, there is no such limitation, and other resin materials may be employed. For example, the resin material 27 may be fluorocarbon resin, acrylic resin, or epoxy resin. This also enhances heat resistance and moisture absorption resistance.

In the first embodiment, the permanent magnet (interpolar back surface magnet 26) whose surface exposed to the outer side is coated with the resin material 27 is rare-earth bond magnet. However, there is no such limitation. For example, the permanent magnet (interpolar back surface magnet 26) may be a ferrite sintered magnet, a ferrite bond magnet, or a rare-earth sintered magnet. Although the neodymium magnet is described as the rare-earth magnet in the first embodiment, a samarium iron nitrogen magnet, a samarium cobalt magnet, or a praseodymium magnet may be employed.

In the first embodiment, the manufacturing method of the rotor 11 includes the chemical vapor deposition step in which the coating with the resin material 27 is performed through chemical vapor deposition. However, there is no such limitation. For example, the manufacturing method of the rotor 11 may include a step of painting or spraying.

A second embodiment of the present invention will now be described with reference to FIGS. 1 and 8A to 10. The motor 1 of the second embodiment differs greatly from the first embodiment in the structures of the back surface auxiliary magnet and the interpolar auxiliary magnet. Otherwise, the motor 1 of the second embodiment is the same as the motor 1 of the first embodiment. Therefore, only portions of the second embodiment that differ from the first embodiment will be described in detail, and the common portions will not be described.

Figure 8A:
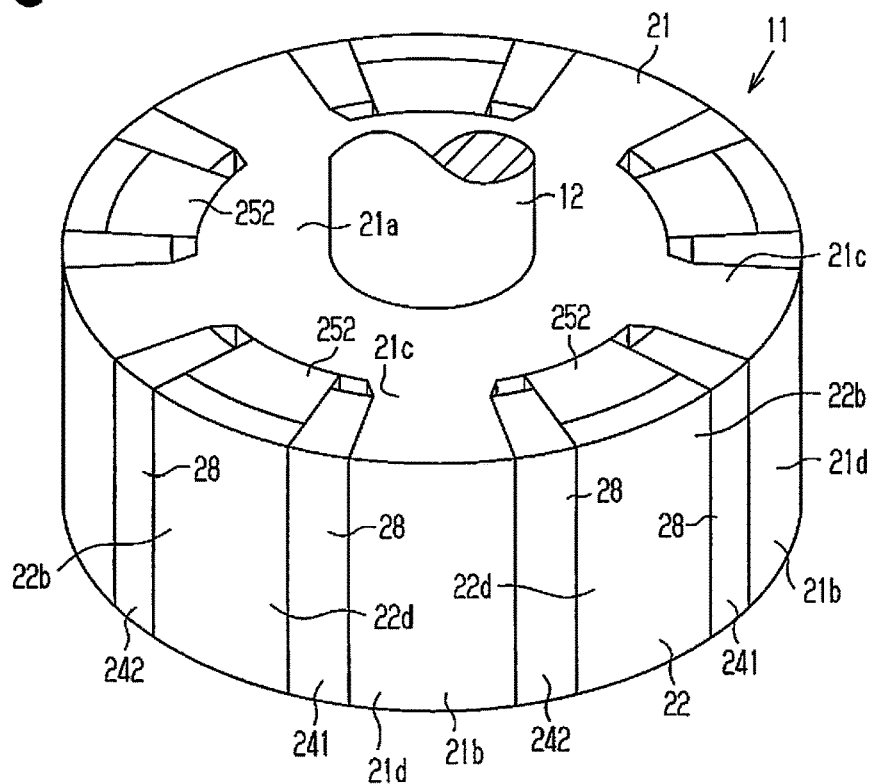
FIGS. 8A and 8B are perspective views of a rotor according to a second embodiment of the present invention.
Figure 8B:
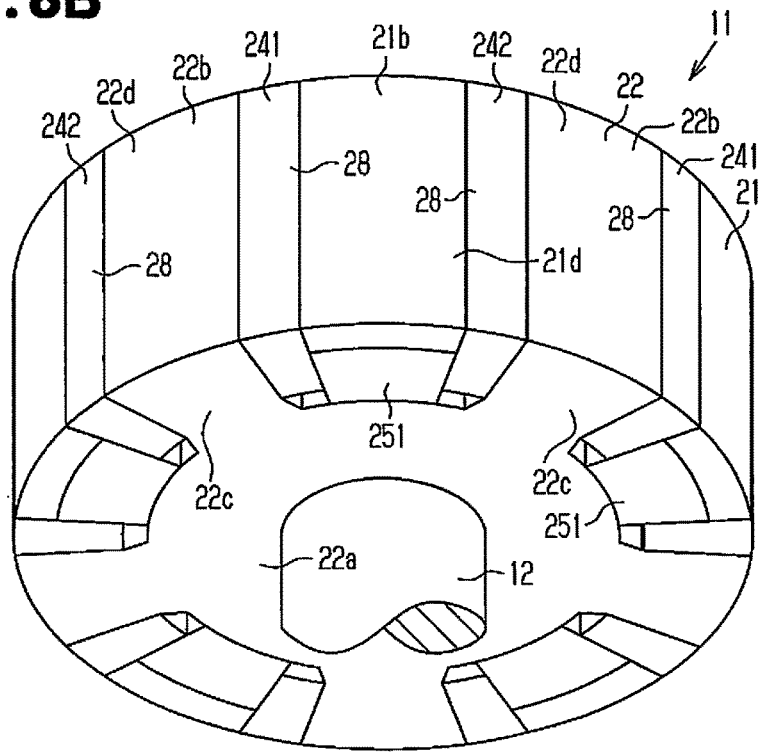
Figure 9:
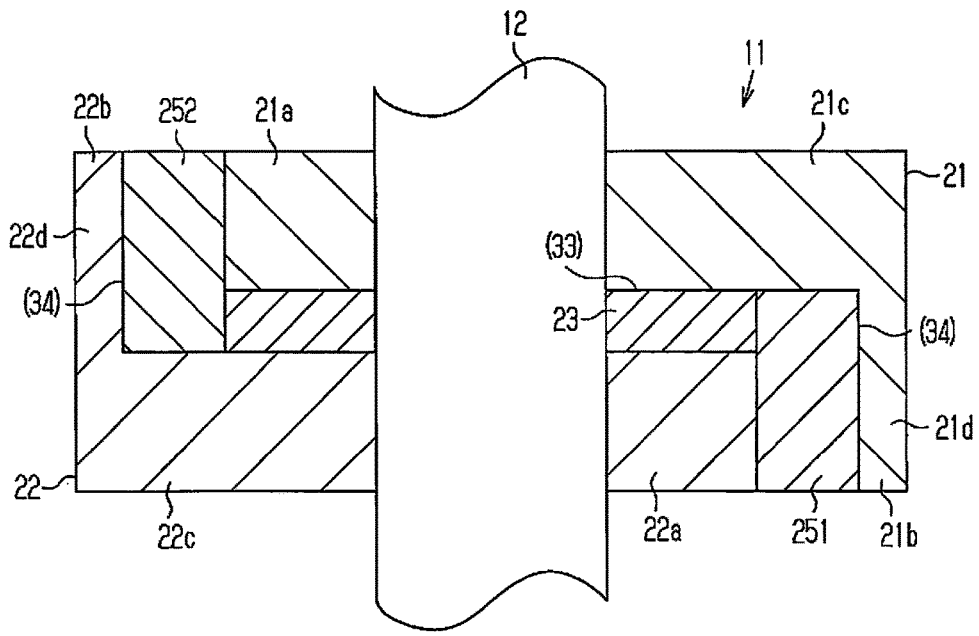
FIG. 9 is a cross-sectional view of the rotor shown in FIG. 8A.

As shown in FIGS. 8A to 9, the rotor 11 includes first and second rotor cores 21 and 22, an annular magnet 23 as a main field magnet (see FIG. 9), first and second back surface auxiliary magnets 251 and 252 as back surface auxiliary magnets (see FIGS. 8A to 9), and first and second interpolar magnets 241 and 242 as interpolar magnets (see FIGS. 8A and 8B).

As shown in FIGS. 8B and 9, the first back surface auxiliary magnets 251 are located between back surfaces (radial inner surfaces) of the first claw-shaped magnetic poles 21b (claws 21d) and an outer circumferential surface of the second core base 22a. Each of the first back surface auxiliary magnets 251 has a substantially rectangular parallelepiped shape, and a sector cross-section orthogonal to the axial direction. The first back surface auxiliary magnet 251 is magnetized in the radial direction to reduce flux leakage where the first back surface auxiliary magnet 251 is located. More specifically, each of the first back surface auxiliary magnets 251 is magnetized in the radial direction so that a portion that abuts against a back surface of the first claw-shaped magnetic pole 21b (claw 21d) is magnetized into the north pole, which is the same magnetic pole as the first claw-shaped magnetic pole 21b, and a portion that abuts against the second core base 22a is magnetized into the south pole, which is the same magnetic pole as the second core base 22a. A circumferential end surface of the first back surface auxiliary magnet 251 is flush with a circumferential end surface of the first claw-shaped magnetic pole 21b.

As shown in FIGS. 8A and 9, the second back surface auxiliary magnets 252 are located between back surfaces (radial inner surface) of the second claw-shaped magnetic poles 22b (claws 22d) and an outer circumferential surface of the first core base 21a. Each of the second back surface auxiliary magnets 252 has a substantially rectangular parallelepiped shape, and a sector cross-section orthogonal to the axial direction. The second back surface auxiliary magnet 252 is magnetized in the radial direction to reduce flux leakage where the second back surface auxiliary magnet 252 is located. More specifically, each of the second back surface auxiliary magnets 252 is magnetized in the radial direction so that a portion that abuts against a back surface of the second claw-shaped magnetic pole 22b (claw 22d) is magnetized into the south pole, which is the same magnetic pole as the second claw-shaped magnetic pole 22b, and a portion that abuts against the first core base 21a is magnetized into the north pole, which is the same magnetic pole as the first core base 21a. A circumferential end surface of the second back surface auxiliary magnet 252 is flush with a circumferential end surface of the second claw-shaped magnetic pole 22b.

As shown in FIG. 9, the first back surface auxiliary magnet 251 and the second back surface auxiliary magnet 252 are arranged so that they are overlapped with each other in an axial position where the annular magnet 23 is located. In other words, the first back surface auxiliary magnet 251 and the second back surface auxiliary magnet 252 are arranged also on the axial position where the annular magnet 23 is located.

The first and second interpolar magnets 241 and 242 are located between the first claw-shaped magnetic poles 21b and the second claw-shaped magnetic poles 22b in the circumferential direction. Axial lengths of the first and second interpolar magnets 241 and 242 of the second embodiment are set to be equal to the axial lengths of the first and second claw-shaped magnetic poles 21b and 22b. The first and second interpolar magnets 241 and 242 have a substantially rectangular parallelepiped shape having a sector cross-section orthogonal to the axial direction. Circumferential end surfaces of the first and second interpolar magnets 241 and 242 abut against (come into surface contact with) circumferential end surfaces of the first and second claw-shaped magnetic poles 21b and 22b and the first and second back surface auxiliary magnets 251 and 252.

The first and second interpolar magnets 241 and 242 are magnetized in the circumferential direction so that they have portions of the same magnetic poles as those of the first and second claw-shaped magnetic poles 21*b* and 22*b* (so that portions closer to the first claw-shaped magnetic poles 21*b* are magnetized into the north poles and portions closer to the second claw-shaped magnetic poles 22*b* are magnetized into the south poles).

Figure 10:
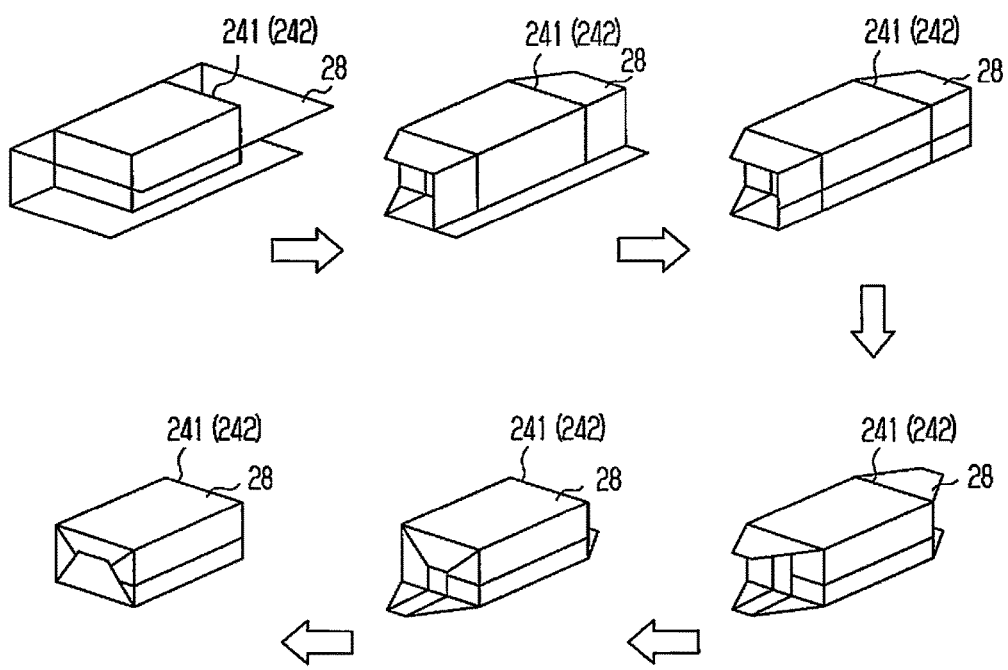
FIG. 10 is a schematic diagram illustrating a heat-shrinkable film of the second embodiment.

Here, each of the first and second interpolar magnets 241 and 242 in the second embodiment is fixed (in the second embodiment, is adhered and fixed in a sandwiched state) between the first claw-shaped magnetic pole 21*b* and the second claw-shaped magnetic pole 22*b* in the circumferential direction with the magnet 241, 242 is covered with an insulative heat-shrinkable film 28 serving as a film (thin film material) which is schematically shown in FIG. 10. In FIG. 10, the first and second interpolar magnets 241 and 242 are schematically shown as rectangular parallelepiped bodies, and the heat-shrinkable film 28 is schematically shown as a transparent member. The heat-shrinkable film 28 of the second embodiment is made of a polyolefin or polyethylene terephthalate material. Hence, the heat-shrinkable film 28 can be inexpensively and easily used. The heat-shrinkable film 28 functions as a resin layer.

The heat-shrinkable film 28 of the second embodiment covers both circumferential end surfaces, radial outer end surfaces, radial inner end surfaces, and both axial surfaces of each the first and second interpolar magnets 241 and 242. That is, the heat-shrinkable film 28 entirely covers the outer surfaces of the first and second interpolar magnets 241 and 242. In the second embodiment, as shown in FIG. 10, the first and second interpolar magnets 241 and 242 are wrapped in a so-called candy-wrapping manner by sequentially (in order of arrows in FIG. 10) bending the heat-shrinkable film 28 along corners of the first and second interpolar magnets 241 and 242. Then, the heat-shrinkable film 28 is heated and closely attached to the first and second interpolar magnets 241 and 242.

The operation of the motor 1 having the above-described structure will now be described.

Since the rotor 11 includes the first and second back surface auxiliary magnets 251 and 252 and the first and second interpolar magnets 241 and 242, flux leakage is reduced at the locations of the magnets. Thus, magnetic flux of the annular magnet 23 can effectively be utilized for output of the motor 1. A large centrifugal force is applied to the first and second interpolar magnets 241 and 242 when the rotor 11 is rotated and driven. In the second embodiment, the elasticity of the heat-shrinkable film 28 between the first and second claw-shaped magnetic poles 21*b* and 22*b* and the first and second interpolar magnets 241 and 242 limits separation of the first and second interpolar magnets 241 and 242 from between the first and second claw-shaped magnetic poles 21*b* and 22*b*.

The advantages of the second embodiment will now be described.

(9) The circumferential end surfaces of the first and second interpolar magnets 241 and 242 are covered with the heat-shrinkable film 28. Hence, the elasticity of the heat-shrinkable film 28 between the first and second interpolar magnets 241 and 242 and the first and second claw-shaped magnetic poles 21*b* and 22*b* can limit separation of the first and second interpolar magnets 241 and 242 from between the first and second claw-shaped magnetic poles 21*b* and 22*b*, and can limit damage (chipping) of the first and second interpolar magnets 241 and 242.

(10) The heat-shrinkable film 28 also covers radial outer end surfaces of the first and second interpolar magnets 241 and 242. Hence, even if the first and second interpolar magnets 241 and 242 are damaged, it is possible to limit radially outward scattering of fragments.

(11) The heat-shrinkable film 28 also covers axial end surfaces of the first and second interpolar magnets 241 and 242. Hence, even if the first and second interpolar magnets 241 and 242 are damaged, it is possible to limit axially outward scattering of fragments.

(12) Since the film is the heat-shrinkable film 28, it can easily be attached in close contact with the first and second interpolar magnets 241 and 242.

The second embodiment may be modified as follows.

In the rotor 11 of the second embodiment, the first and second interpolar magnets 241 and 242 may be separated (projected) radially outward. Instead, to restrict radially outward movement of the first and second interpolar magnets 241 and 242, an engaging portion which is radially engaged with the first and second interpolar magnets 241 and 242 may be formed on at least one of the first and second claw-shaped magnetic poles 21*b* and 22*b* and the first and second back surface auxiliary magnets 251 and 252.

Figure 11:
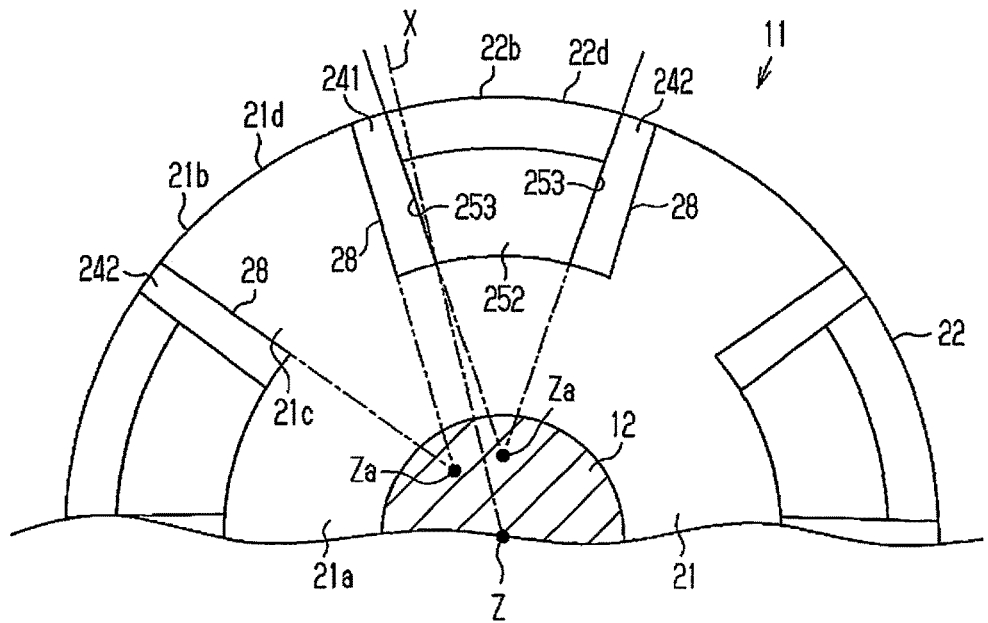
FIG. 11 is a partial plan view of a rotor in another example of the second embodiment.

The rotor 11 may be changed as shown in FIG. 11 for example. In this example (see FIG. 11), circumferential end surfaces of the first and second back surface auxiliary magnets 251 and 252 (only the second back surface auxiliary magnet 252 is shown in FIG. 11) are back surface inclined surfaces 253 which are inclined relative to straight line X (straight line extending through axis Z of the rotor 11) in the radial direction. More specifically, each of the back surface inclined surfaces 253 is inclined to project in the circumferential direction beyond straight line X toward the radially outer side. Thus, the back surface inclined surfaces 253 function as the engaging portions. In other words, in this example (see FIG. 11), the circumferential end surfaces of the first and second back surface auxiliary magnets 251 and 252 (only the second back surface auxiliary magnet 252 is shown in FIG. 11) conform with a circumferential end surface of a sector shape which has an axis at point Za located in the radial outer side of the axis Z of the rotor 11. In this example (see FIG. 11), circumferential end surfaces of the first and second claw-shaped magnetic poles 21*b* and 22*b* are flush with the back surface inclined surfaces 253. That is, the circumferential end surfaces of the first and second claw-shaped magnetic poles 21*b* and 22*b* form a portion of the engaging portion together with the back surface inclined surfaces 253. Each of the first and second interpolar magnets 241 and 242 of this example (see FIG. 11) is shaped so that a circumferential width becomes narrower toward a radial outer side to be in surface contact with the back surface inclined surface 253 in accordance with the shape of the back surface inclined surface 253. Obviously, the first and second interpolar magnets 241 and 242 of this example (see FIG. 11) are covered with the heat-shrinkable film 28 like the second embodiment.

Thus, the back surface inclined surfaces 253 function to prevent the first and second interpolar magnets 241 and 242 from being separated radially outward without additional discrete members. The circumferential end surfaces of the first and second claw-shaped magnetic poles 21*b* and 22*b* (projections 21*c* and 22*c* and claws 21*d* and 22*d*) may also prevent the first and second interpolar magnets 241 and 242 from being separated radially outward.

Figure 12:
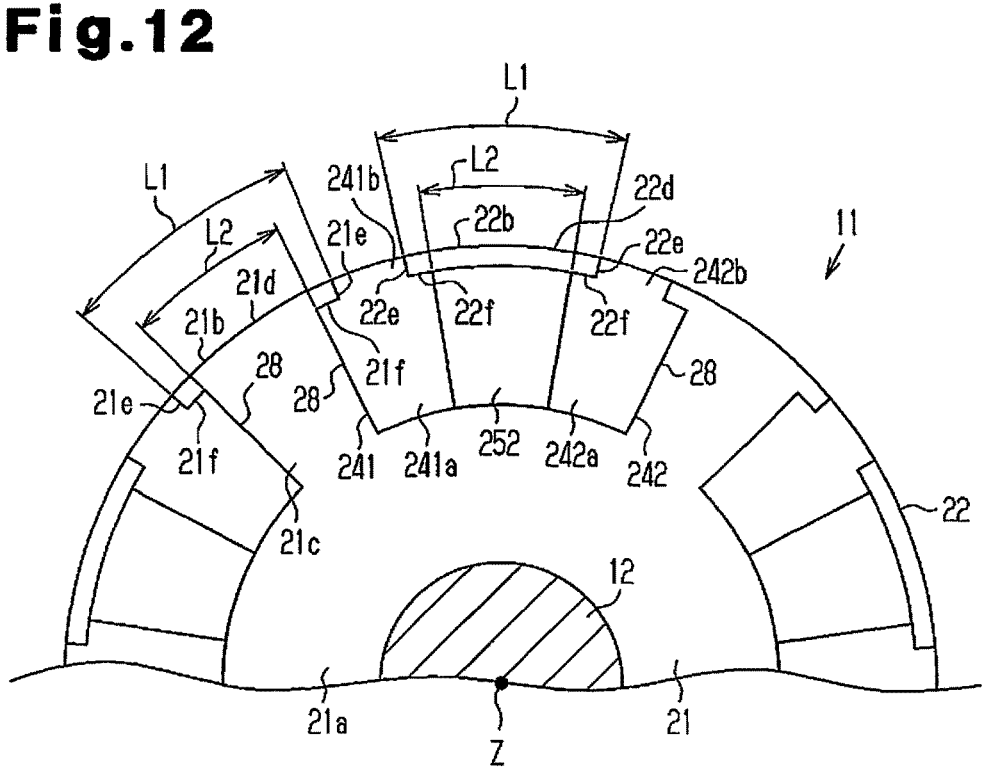
FIG. 12 is a partial plan view of a rotor in another example of the second embodiment.

The rotor 11 may be changed as shown in FIG. 12 for example. In this example (see FIG. 12), the claws 21*d* and 22*d* include circumferentially extending portions 21*e* and 22*e* which extend in the circumferential direction from distal ends of the projections 21*c* and 22*c*. In other words, angle L (around axis Z) corresponding to circumferential widths of the claws 21*d* and 22*d* is set to be greater than angle L2 (around axis Z) corresponding to circumferential widths of the projections 21*c* and 22*c*. In this example (see FIG. 12), radial inner surfaces 21*f* and 22*f* in the circumferentially extending portions 21*e* and 22*e* of the claws 21*d* and 22*d* configure engaging portions. In this example, radial lengths of the claws 21*d* and 22*d* are changed to lengths (e.g., about ⅙), which are significantly shorter than the radial lengths of the projections 21*c* and 22*c*. The first and second interpolar magnets 241 and 242 in this example (see FIG. 12) respectively include inner interpolar magnet portions 241*a* and 242*a* arranged between the projection 21*c* and the projection 22*c* (not shown in FIG. 12) in the circumferential direction, and outer interpolar magnet portions 241*b* and 242*b* arranged between the claws 21*d* and 22*d* in the circumferential direction. Obviously, the first and second interpolar magnets 241 and 242 in this example (see FIG. 12) are also covered with the heat-shrinkable film 28 like the second embodiment.

Thus, the radial inner surfaces 21*f* and 22*f* may function to prevent the first and second interpolar magnets 241 and 242 from being separated radially outward without providing additional discrete members.

Figure 13:
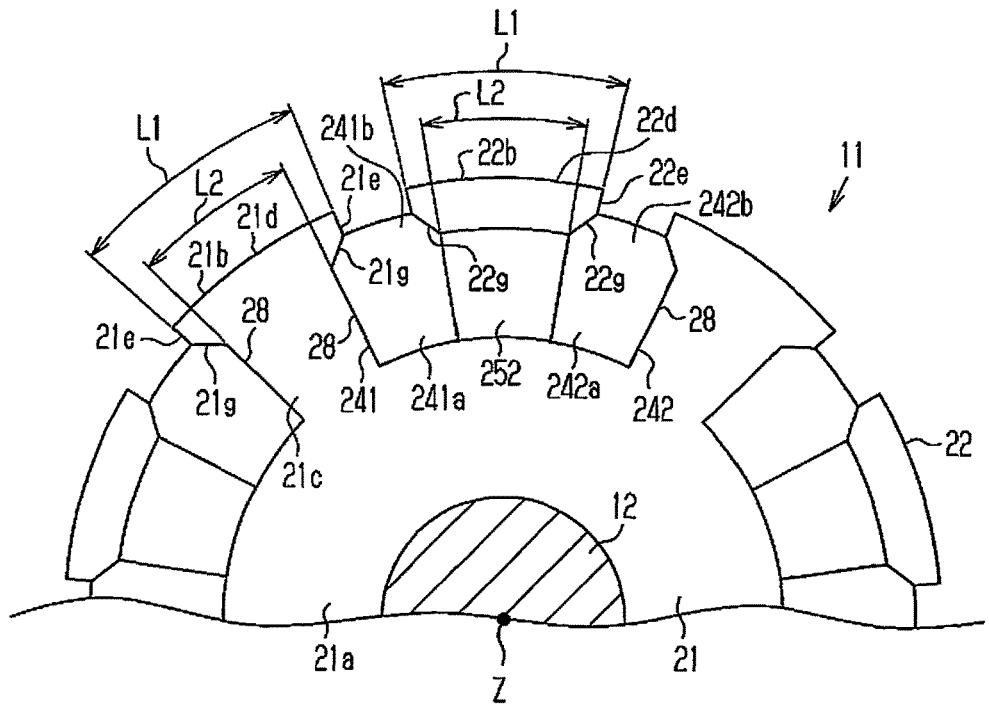
FIG. 13 is a partial plan view of a rotor in another example of the second embodiment.

Further, the rotor 11 may be changed as shown in FIG. 13, for example. In this example (see FIG. 13), radial inner surfaces (engaging portions) of the circumferentially extending portions 21*e* and 22*e* of the claws 21*d* and 22*d* are claw inclined surfaces 21*g* and 22*g*. More specifically, the claw inclined surfaces 21*g* and 22*g* extend radially outward toward circumferential distal ends of the circumferentially extending portions 21*e* and 22*e*. In this example, cross-sections of the first and second interpolar magnets 241 and 242 orthogonal to the axial direction have trapezoidal shapes so that the outer interpolar magnet portions 241*b* and 242*b* abut against (come into surface contact with) the claw inclined surfaces 21*g* and 22*g*. Thus, the first and second interpolar magnets 241 and 242 can be formed into shapes which are not easily damaged (for example, by configuring that inner angles around claw inclined surfaces 21*g* and 22*g* are obtuse angles when viewed from the axial direction), and additionally the outer interpolar magnet portions 241*b* and 242*b* can be arranged between the claws 21*d* and 22*d* (claw inclined surfaces 21*g* and 22*g*) in the circumferential direction.

Figure 14:
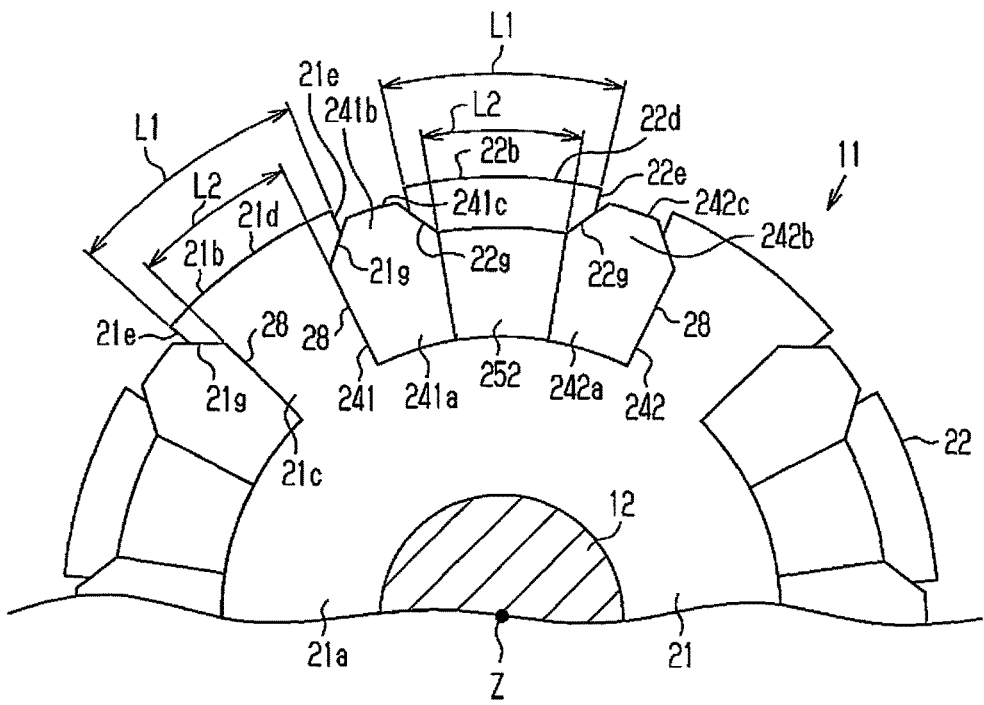
FIG. 14 is a partial plan view of a rotor in another example of the second embodiment.

In this example (see FIG. 13), the outer interpolar magnet portions 241*b* and 242*b* extend to the same radial positions as radial outer ends of the claw inclined surfaces 21*g* and 22*g*. Instead, the outer interpolar magnet portions 241*b* and 242*b* may include protrusions 241*c* and 242*c* which protrude radially outward from the claw inclined surfaces 21*g* and 22*g*. Protruding amounts of the protrusions 241*c* and 242*c*, i.e., distances from the axis Z to radial outer ends of the protrusions 241*c* and 242*c* are set to be equal to or less than distances from axis Z to the radial outer ends of the first and second claw-shaped magnetic poles 21*b* and 22*b*. Thus, the interpolar magnets (first and second interpolar magnets 241 and 242) have a larger volume as compared with the above described example that does not include the protrusions 241*c* and 242*c* (see FIG. 13). This reduces flux leakage in a satisfactory manner. The protruding amounts of the protrusions 241*c* and 242*c* are set to be equal to or less than the distances from axis Z to the radial outer ends of the first and second claw-shaped magnetic poles 21*b* and 22*b*. Hence, the protrusions 241*c* and 242*c* do not project radially outward beyond the first and second claw-shaped magnetic poles 21*b* and 22*b*. Hence, an air gap between the rotor 11 and the stator 6 arranged on the radially outward of the rotor 11 is not widened by the protrusions 241*c* and 242*c*, for example. In this example (see FIG. 14), the protrusions 241*c* and 242*c* and the first and second claw-shaped magnetic poles 21*b* and 22*b* (claws 21*d* and 22*d*) can be spaced apart from each other. Thus, it is possible to avoid the influence of local opposing magnetic field to exerted on the protrusions 241*c* and 242*c*, and it is possible to limit demagnetization of the protrusions 241*c* and 242*c* (first and second interpolar magnets 241 and 242).

In the second embodiment, the heat-shrinkable film 28 is bent along the corners of the first and second interpolar magnets 241 and 242 in order (of arrows in FIG. 10) in a candy-wrapping manner. Then, the heat-shrinkable film 28 is heated to be arranged on the first and second interpolar magnets 241 and 242. The present invention is not limited to this, and this wrapping (covering) manner may be changed to others.

For example, the heat-shrinkable film 28 may be arranged on the first and second interpolar magnets 241 and 242 in a manner as shown in FIG. 15. That is, at first, the heat-shrinkable film 28 is bent to sandwich the first and second interpolar magnets 241 and 242. Then, the heat-shrinkable film 28 is heated so that its portions other than the bent portion (on the deep side in FIG. 15) (that is, portions schematically shown by broken lines, which correspond to three sides of a square of the first (second) interpolar magnet 241 (242) as viewed from the top) are bonded to the first and second interpolar magnets 241 and 242.

Further, the heat-shrinkable film 28 may be arranged on the first and second interpolar magnets 241 and 242 in a manner as shown in FIG. 16, for example. That is, a roll heat-shrinkable film 28 is formed to be tubular by a bag-making machine (bag former). The first and second interpolar magnets 241 and 242 are inserted into such formed tube-shaped film 28. Then, for the heat-shrinkable film 28, its joint and its front and rear portions of the tube shape are heated and closed.

In the second embodiment, the heat-shrinkable film 28 covers both circumferential end surfaces, the radial outer end surfaces, the radial inner end surfaces, and both axial both end surfaces of the first and second interpolar magnets 241 and 242. That is, the heat-shrinkable film 28 is provided to cover entire outer surfaces of the first and second interpolar magnets 241 and 242. It is only necessary that the heat-shrinkable film 28 cover at least the circumferential end surfaces of the first and second interpolar magnets 241 and 242.

The film (heat-shrinkable film 28) may be provided to cover at least radial outer end surfaces of the first and second interpolar magnets 241 and 242 without covering their circumferential end surfaces. Thus, even if the first and second interpolar magnets 241 and 242 are damaged, it is possible to limit their fragments from scattering radially outward. The film (heat-shrinkable film 28) may cover at least axial end surfaces of the first and second interpolar magnets 241 and 242 without covering their circumferential end surfaces. Thus, even if the first and second interpolar magnets 241 and 242 are damaged, it is possible to limit their fragments from scattering axially outward.

Although the film is the heat-shrinkable film 28 in the second embodiment, the heat-shrinkable film 28 may be changed to other films (thin film materials), which is not heat-shrinkable.

The rotor 11 of the second embodiment may be changed to a rotor including a field magnet film 33 (see FIG. 9) that covers at least a portion (e.g., the entire outer surface) of the annular magnet 23 (field magnet). Thus, the elasticity of the field magnet film can serve to limit damage (chipping) of the annular magnet 23 (field magnet).

The rotor 11 of the second embodiment may be changed to a rotor including a back surface magnet film 34 (see FIG. 9) which covers at least portions (e.g., the entire outer surfaces) of the first and second back surface auxiliary magnets 251 and 252 (back surface auxiliary magnets). Thus, elasticity of the back surface magnet film 34 can serve to limit separation and damage (chipping) of the first and second back surface auxiliary magnets 251 and 252 (back surface auxiliary magnets).

A third embodiment of the present invention will now be described with reference to FIGS. 17 and 18. A motor 1 of the third embodiment differs from that of the first embodiment in that a rotor 11 includes a rubber magnet 51. Otherwise, the motor 1 of the third embodiment is the same as the motor 1 of the first embodiment. Therefore, only portions of the third embodiment that differ from the first embodiment will be described in detail, and the common portions will not be described.

Figure 17:
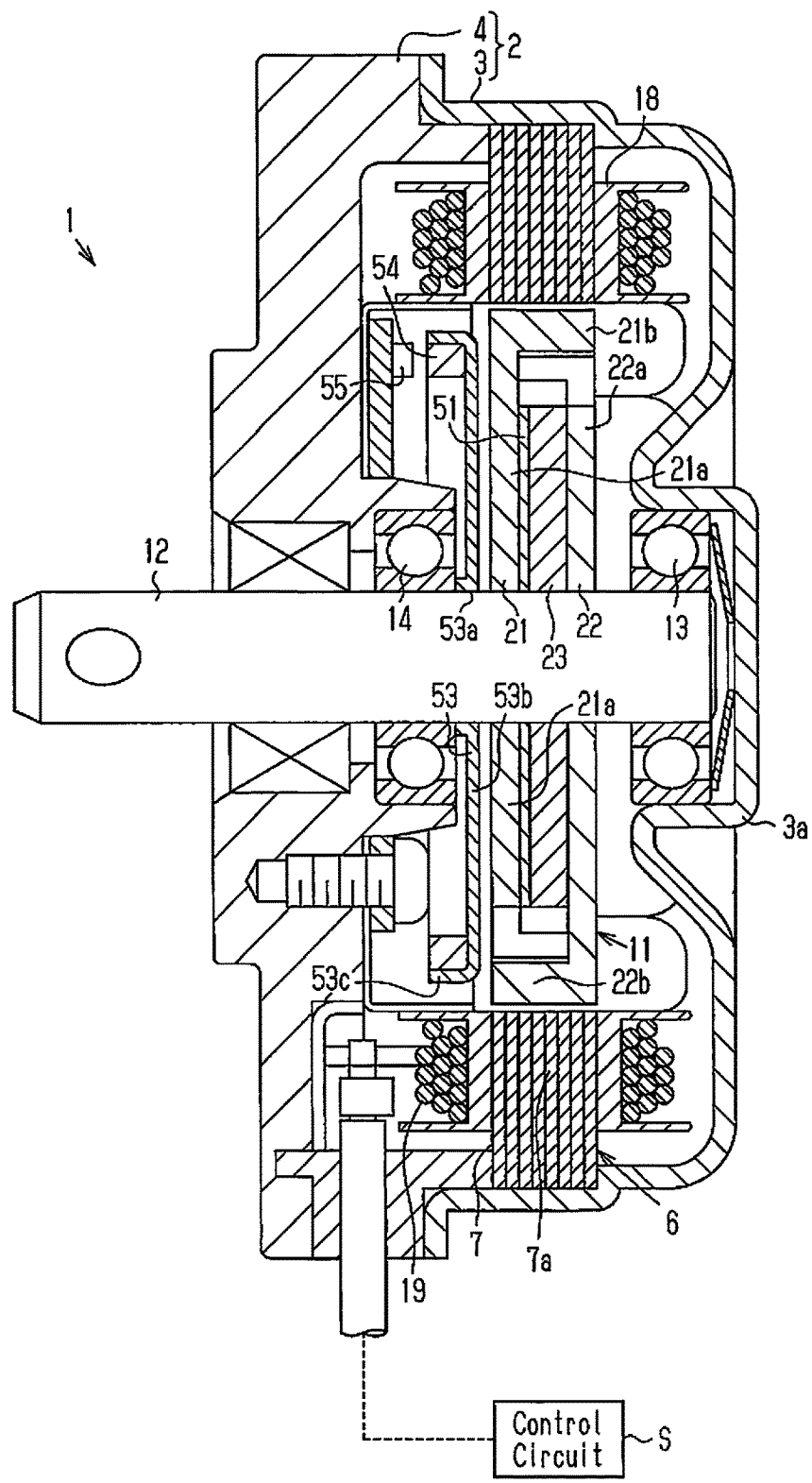
FIG. 17 is a cross-sectional view of a motor according to a third embodiment of the present invention.

As shown in FIG. 17, a stator 6 is fixed to an inner circumferential surface of a cylindrical housing 3. The stator 6 includes an armature core 7 including a plurality of (12 in this embodiment) teeth 7a, serving as concentrated winding teeth extending inward in the radial direction, and a winding 19 wound around the teeth 7a of the armature core 7 with an insulator 18 arranged in between. When drive current is supplied from an external control circuit S to the winding 19, the stator 6 generates a rotating field.

Figure 18:
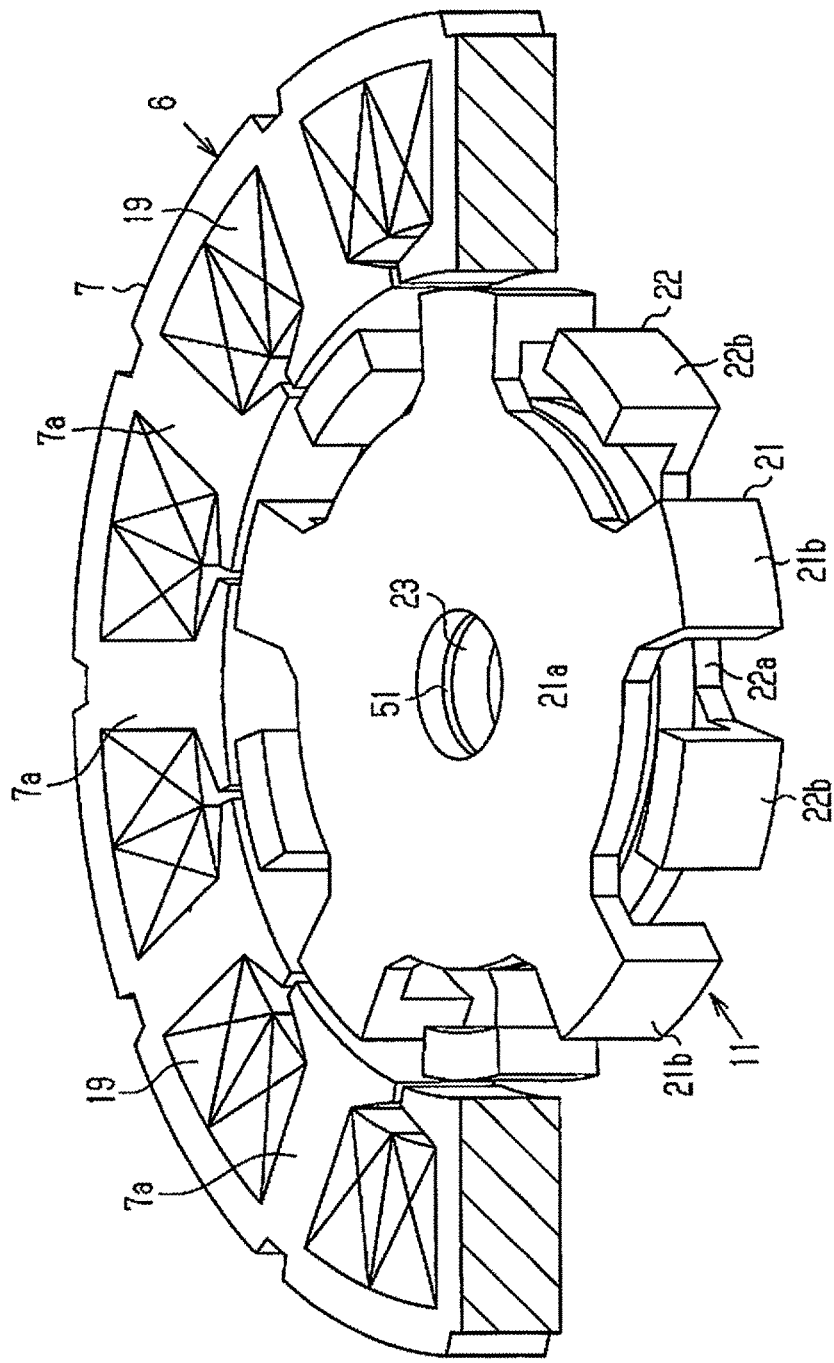
FIG. 18 is a partial cross-sectional perspective view of the motor shown in FIG. 17.

As shown in FIGS. 17 and 18, the rotor 11 includes first and second rotor cores 21 and 22 fixed to a rotation shaft 12, an annular magnet 23 serving as a field magnet arranged between the first rotor core 21 and the second rotor core 22 in the axial direction, and the rubber magnet 51 serving as an elastic member arranged between the first rotor core 21 and the second rotor core 22 in the axial direction.

The rotation shaft 12 is press-fitted into central holes of the first and second rotor cores 21 and 22. More specifically, the rotation shaft 12 is press-fitted into and fixed to the first and second rotor cores 21 and 22 so that the distance between axial outer portions (opposed portions) of first and second core bases 21a and 22a is equal to a predetermined fixed distance. Here, the second rotor core 22 is coupled to the first rotor core 21 so that second claw-shaped magnetic poles 22b are located between adjacent ones of the first claw-shaped magnetic poles 21b in the circumferential direction and so that the annular magnet 23 and the rubber magnet 51 are arranged (sandwiched) between the first core base 21a and the second core base 22a in the axial direction.

The annular magnet 23 is a hard magnet such as a ferrite magnet and a neodymium magnet, and is shaped to be annular and include a central hole. The annular magnet 23 is magnetized in the axial direction so that the first claw-shaped magnetic poles 21b function as first magnetic poles (north poles in this embodiment) and the second claw-shaped magnetic poles 22b function as second magnetic poles (south poles in this embodiment). That is, the rotor 11 of the third embodiment is a rotor of a so-called Lundell type structure using the annular magnet 23 as a field magnet. The rotor 11 includes five first claw-shaped magnetic poles 21b serving as north poles, and five second claw-shaped magnetic poles 22b serving as south poles. The first claw-shaped magnetic poles 21b and the second claw-shaped magnetic poles 22b are alternately arranged in the circumferential direction, and the number of poles of the rotor 11 is 10 (the number of pairs of poles is five). That is, in the third embodiment, the number of poles of the rotor 11 is set to be "10", and the number of the teeth 7a of the stator 6 is set to be "12".

The rubber magnet 51 is a magnet which has elasticity and is magnetized in the axial direction, and the rubber magnet 51 has the shape of a disk and a thickness that differs from the annular magnet 23. In the third embodiment, the rubber magnet 51 is sandwiched between the annular magnet 23 and the first core base 21a in the axial direction. The rubber magnet 51 is magnetized in the same direction as the annular magnet 23.

As shown in FIG. 17, a sensor magnet 54 is arranged on the rotor 11 through a substantially disk-shaped magnet fixing member 53. More specifically, the magnet fixing member 53 includes a disk portion 53b, a boss 53a formed in a central portion of the disk portion 53b, and a cylindrical portion 53c extending like a cylinder from an outer edge of the disk portion 53b. The sensor magnet 54 abuts against and is fixed to an inner circumferential surface of the cylindrical portion 53c and a surface of the disk portion 53b. The magnet fixing member 53 is located in the rotor 11 at a position closer to the first rotor core 21, and the boss 53a is fitted and fixed to the rotation shaft 12.

In a front end plate 4, a Hall IC 55 serving as a magnetic sensor is arranged at a location opposed to the sensor magnet 54 in the axial direction. If the Hall IC 55 detects magnetic fields of the north pole and south pole based on the sensor magnet 54, the Hall IC 55 outputs a detection signal having an H level and a detection signal having an L level to the control circuit S.

The operation of the brushless motor 1 having the above-described structure will now be described.

If three-phase drive current is supplied from the control circuit S to the winding 19, the stator 6 generates rotating field, and the rotor 11 is rotated and driven. Here, if the sensor magnet 54 which is opposed to the Hall IC 55 rotates, a level of a detection signal which is output from the Hall IC 55 is switched in accordance with a rotation angle (position) of the rotor 11. Based on the detection signal, three-phase drive current, which is shifted at an optimal timing, is supplied from the control circuit S to the winding 19. Thus, a satisfactory rotating field is generated, and the rotor 11 is continuously rotated and driven in a satisfactory manner.

Advantages of the third embodiment will now be described.

(13) The rubber magnet 51 is held between the annular magnet 23 and the first core base 21a in the axial direction. Therefore, even if the various members in the axial direction do not have high dimensional accuracy, loosening of the annular magnet 23 is limited, and cracking of the annular magnet 23 is limited.

(14) The rubber magnet 51, which is elastic and magnetized in the axial direction, is used as a sandwiched elastic member. Thus, magnetic flux from the rubber magnet 51 can be superimposed on magnetic flux from the annular magnet 23 to enhance motor efficiency.

The third embodiment may be modified as follows.

Figure 19:
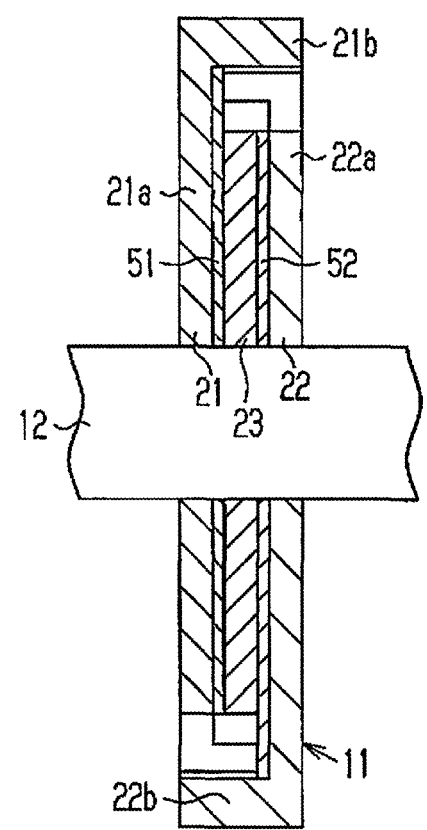
FIG. 19 is a cross-sectional view of a rotor in another example of the third embodiment.

Although the rubber magnet 51 is sandwiched only between the annular magnet 23 and the first core base 21a in the axial direction in the third embodiment, a rubber magnet 52 may be sandwiched also between the annular magnet 23 and the second core base 22a in the axial direction, as shown in FIG. 19. Thus, it is possible to prevent hard core bases (first and second core bases 21a and 22a) from pressing and coming into contact with the annular magnet 23, and cracking of the annular magnet 23 is more efficiently limited. Outwardly projecting portions are formed on outer peripheries of the rubber magnets 51 and 52 of this example (see FIG. 19) to cover portions of the first and second claw-shaped magnetic poles 21b and 22b that project radially outward from outer peripheral ends of the first and second core bases 21a and 22a.

Although the rubber magnet 51 is used as the elastic member in the third embodiment, other members having elasticity may be used, and the rubber magnet 51 may be changed to a magnet sheet for example. The rubber magnet 51 may be changed to a magnetic body (other than magnet) having elasticity, such as a magnetic rubber in which magnetic iron powder is mixed into rubber, for example. Even with such a material, it is possible to reduce magnetic resistance between the annular magnet 23 and the core base as compared with when non-magnetic body is used, and it is possible to prevent motor efficiency from being deteriorated.

Although the present invention is embodied in the brushless motor in which the number of poles of the rotor 11 is set to "10", and the number of the teeth 7a of the stator 6 is set to "12" in the third embodiment, the number of poles of the rotor 11 and the number of the teeth 7a of the stator 6 may be changed. For example, the present invention may be embodied in a brushless motor in which the number of poles of the rotor 11 is set to "8", and the number of the teeth 7a of the stator 6 is set to "12".

In the rotor 11 of the third embodiment, back surface auxiliary magnets which are magnetized in the radial direction may be arranged on radially inner sides (back surfaces) of the first and second claw-shaped magnetic poles 21b and 22b to suppress leakage (short circuit) magnetic flux at these portions.

In the rotor 11 of the third embodiment, interpolar magnets which are magnetized in the circumferential direction may be arranged between the first and second claw-shaped magnetic poles 21b and 22b in the circumferential direction to limit flux leakage at these portions.

A fourth embodiment of a motor will now be described with reference to FIGS. 20 to 23.

Figure 20:
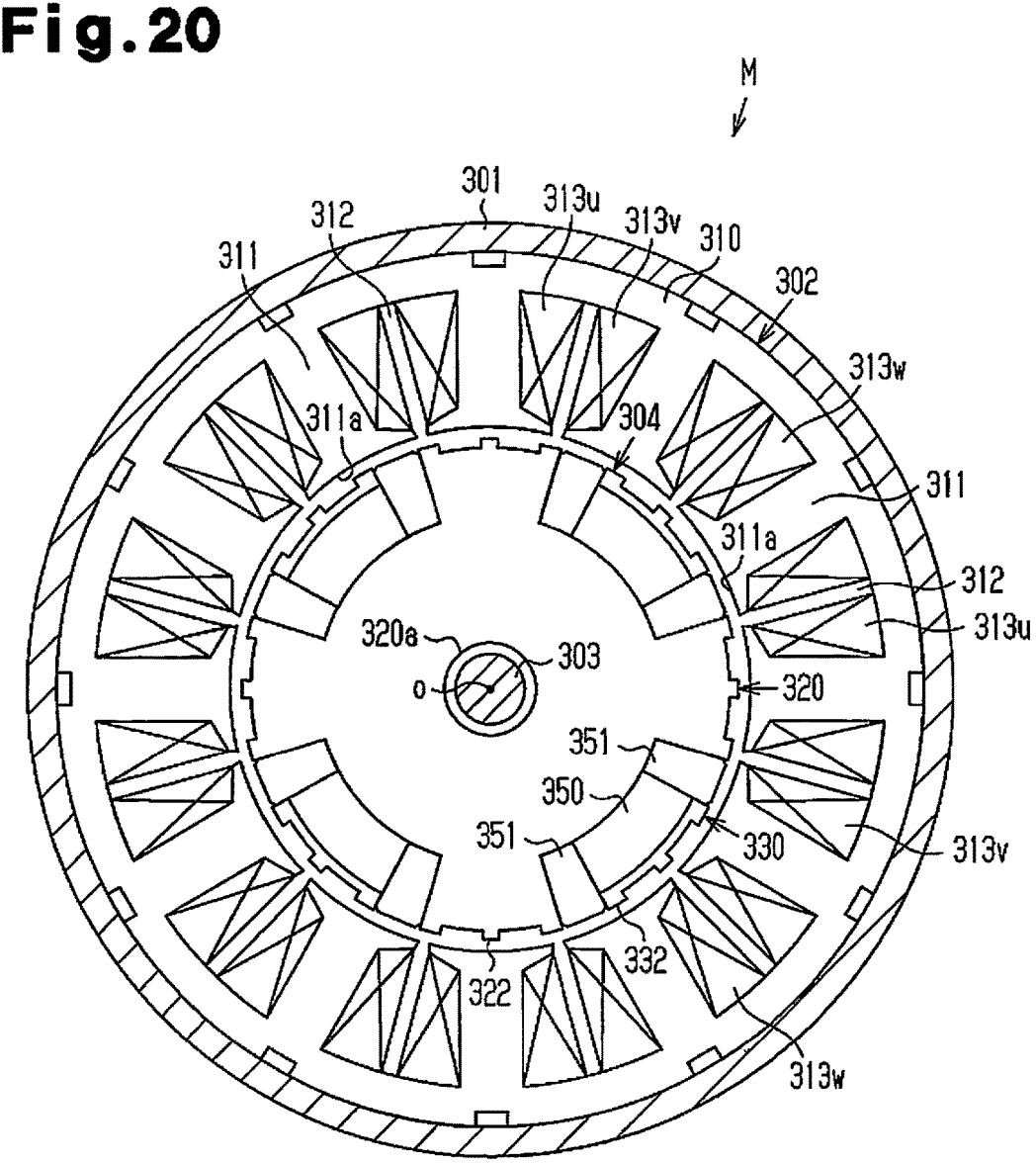
FIG. 20 is a partial cross-sectional view of a brushless motor according to a fourth embodiment of the present invention.

As shown in FIG. 20, a brushless motor M includes a motor housing 301, a stator 302 fixed to an inner circumferential surface of the motor housing 301, and a rotor 304 of a so-called Lundell type structure arranged at the inner side of the stator 302. The rotor 304 of the Lundell type structure is fixed to a rotation shaft 303 and integrally rotates with the rotation shaft 303. The rotation shaft 303 is a non-magnetic stainless-steel shaft, and is rotatably supported on the motor housing 301 by bearings (not shown) provided in the motor housing 301.

The stator 302 includes a cylindrical stator core 310, and an outer circumferential surface of the stator core 310 is fixed to an inner surface of the motor housing 301. A plurality of teeth 311 are arranged on the inner side of the stator core 310 to extend along the axial direction and arranged in the circumferential direction at an equal pitch. The teeth 311 extend radially inward. Each of the teeth 311 is T-shaped and has an arcuate inner circumferential surface 311a at the radially inner side. The arcuate surface is obtained by extending an arc in the axial direction about the center axis O of the rotation shaft 303.

Slots 312 are formed between the adjacent teeth 311 in the circumferential direction. In the fourth embodiment, the number of the teeth 311 is 12, and the number of the slots 312 is also 12 and the same as the teeth 311. Three-phase windings, namely, U-phase windings 313u, V-phase windings 313v, and W-phase windings 313w are wound around the twelve teeth 311 in this order in the circumferential direction in a concentrated winding manner, and the windings are arranged in the slots 312.

Three-phase power supply voltage is applied to the windings 313u, 313v and 313w so that the stator 302 generates a rotating field. This rotates the rotor 304 fixed to the rotation shaft 303 located at the inner side of the stator 302.

Figure 21:
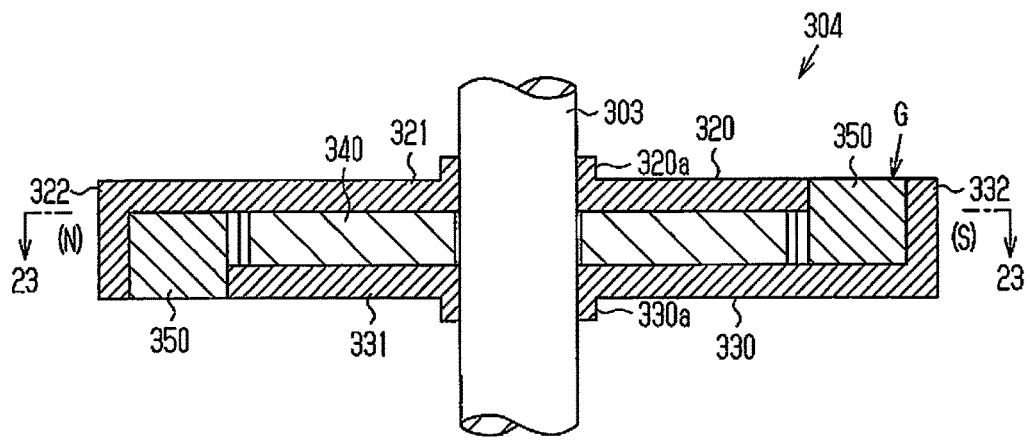
FIG. 21 is a partial cross-sectional view of a rotor shown in FIG. 20.
Figure 22:
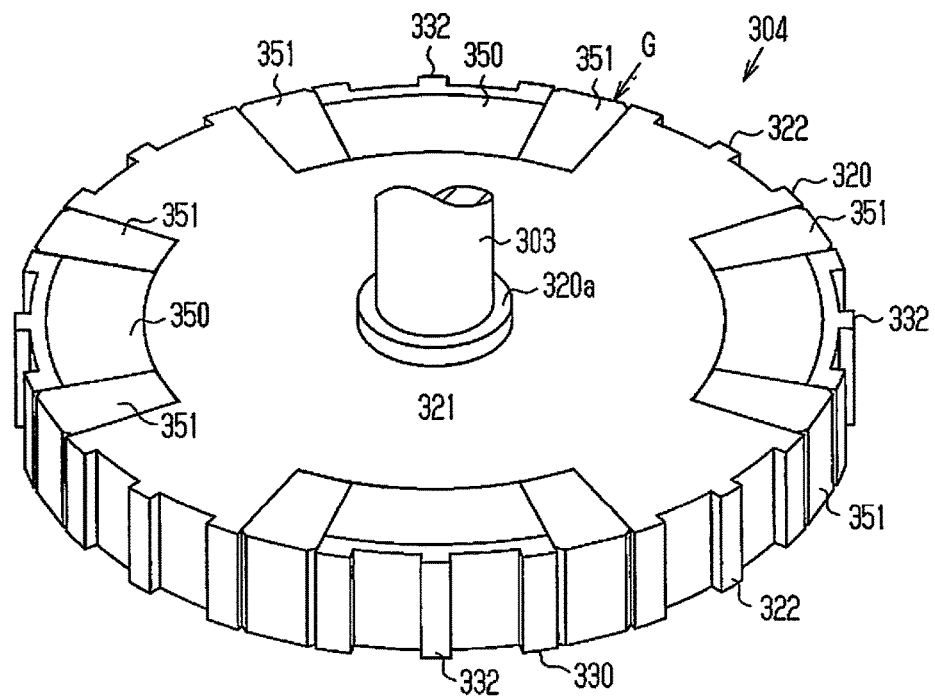
FIG. 22 is a perspective view of the rotor shown in FIG. 20.
Figure 23:
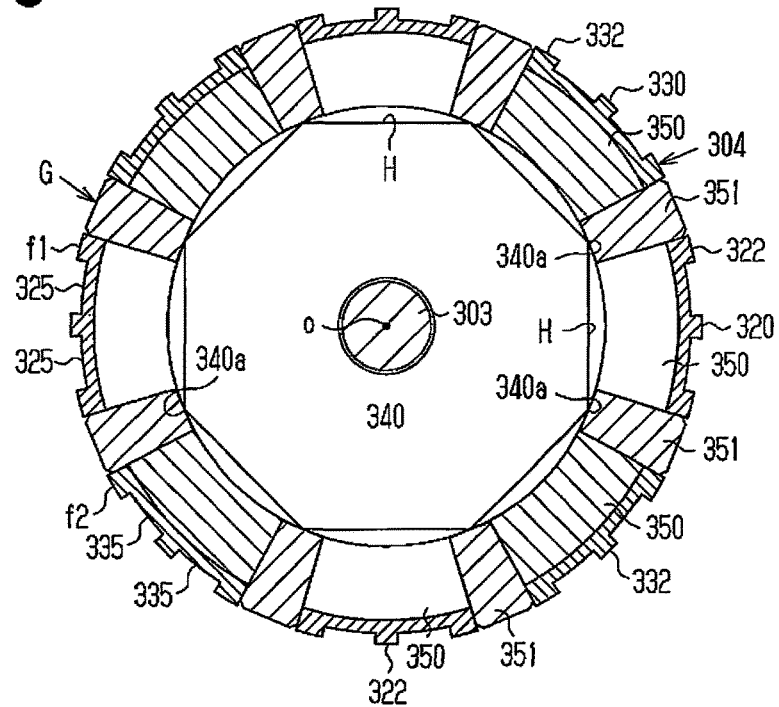
FIG. 23 is a cross-sectional view taken along line 23-23 in FIG. 21.

As shown in FIGS. 21 to 23, the rotor 304 includes first and second rotor cores 320 and 330, a field magnet 340, back surface magnets 350, and interpolar magnets 351. The back surface magnets 350 and the interpolar magnets 351 configure auxiliary magnets G which limit flux leakage as will be described later.

The first rotor core 320 is made of soft magnetic material, and formed from an electromagnetic steel sheet in the fourth embodiment. The first rotor core 320 includes a substantially disk-shaped first core base 321, and a boss 320a is formed in the first core base 321. The rotation shaft 303 is inserted into and fixed to the boss 320a. A plurality of (four in fourth embodiment) first claw-shaped magnetic poles 322 are arranged at equal intervals on an outer circumferential surface of the first core base 321. The first claw-shaped magnetic poles 322 project radially outward and extend in the axial direction.

A radial outer surface f1 of each of the first claw-shaped magnetic poles 322 of the fourth embodiment has a cross-sectional shape of an arcuate surface orthogonal to the axial direction, and the arcuate surface extends around the center axis O of the rotation shaft 303. The radial outer surface f1 includes two auxiliary grooves 325.

As shown in FIG. 21, the second rotor core 330 is made of the same material and has the same shape as the first rotor core 320. The second rotor core 330 has a substantially disk-shaped second core base 331 and includes a boss 330a. The rotation shaft 303 is inserted into and fixed to the boss 330a. A plurality of (four in fourth embodiment) second claw-shaped magnetic poles 332 are arranged at equal intervals on an outer circumferential surface of the second core base 331. The second claw-shaped magnetic poles 332 project radially outward and extend in the axial direction.

A radial outer surface f2 of each of the second claw-shaped magnetic poles 332 of the fourth embodiment has a cross-sectional shape of an arcuate surface orthogonal to the axial direction, and the arcuate surface extends about the center axis O of the rotation shaft 303. The radial outer surface f2 includes two auxiliary grooves 335. If the rotor 304 is rotated by vibration or the like when the motor is not driven, the distances between the teeth 311 are varied, and thereby the auxiliary grooves 325 and 335 largely generate variation in magnetic flux. A variation in the magnetic flux produces a load when the motor rotates and increases the detent torque.

The rotation shaft 303 is press-fitted into the bosses 320a and 330a, thereby fixing the first and second rotor cores 320 and 330 to the rotation shaft 303. Here, the second rotor core 330 is coupled to the first rotor core 320 so that the second claw-shaped magnetic poles 332 are located between the adjacent first claw-shaped magnetic poles 322 and the field magnet 340 is arranged (sandwiched) between the first core base 321 and the second core base 331 in the axial direction.

As shown in FIG. 21, the field magnet 340 is a substantially disk-shaped permanent magnet including a central hole and made of a ferrite magnet or a neodymium magnet. The field magnet 340 is magnetized in the axial direction so that the first claw-shaped magnetic poles 322 function as first magnetic poles (north poles in the fourth embodiment) and second claw-shaped magnetic poles 332 function as second magnetic poles (south poles in the fourth embodiment). That is, the rotor 304 in the fourth embodiment is a so-called Lundell type structure. In the rotor 304, four first claw-shaped magnetic poles 322 functioning as the north poles and four second claw-shaped magnetic poles 332 functioning as the south poles are alternately arranged in the circumferential direction. The number of poles of the rotor 304 is eight (the number of pairs of poles is four). That is, in the brushless motor M of the fourth embodiment, the number of magnetic poles of the rotor 304 is set to "8", and the number of the teeth 311 (slots 312) of the stator 302 is set to "12".

As shown in FIG. 21, the rotor 304 of the fourth embodiment includes the back surface magnets 350 located radially inward from the first and second claw-shaped magnetic poles 322 and 332 (back surface), and between the first and second claw-shaped magnetic poles 322 and 332 and the field magnet 340. The back surface magnets 350 are magnetized in the radial direction to limit leakage (short circuit) magnetic flux where the back surface magnets 350 are located. Each of the back surface magnets 350 in the fourth embodiment has the form of a sector as viewed in the axial direction. An arc-shaped radially inner side surface of the back surface magnet 350 has the same diameter as outer circumferential surfaces of the first and second core bases 321 and 331.

As shown in FIG. 22, the rotor 304 of the fourth embodiment includes the interpolar magnets 351 arranged between the first and second claw-shaped magnetic poles 322 and 332 in the circumferential direction. The interpolar magnets 351 are magnetized in the circumferential direction to limit flux leakage where the interpolar magnets 351 are located. Each of the interpolar magnets 351 in the fourth embodiment has the form of a sector as viewed in the axial direction. A radially inner side surface of the interpolar magnet 351 is a flat surface, and a straight portion of the flat surface as viewed in the axial direction extends in parallel to a tangent of outer circumferential surfaces of the first and second core bases 321 and 331.

Here, as shown in FIG. 23, non-abutment portions H for partially preventing abutment with the auxiliary magnets G (back surface magnet 350 and interpolar magnet 351) are formed on the field magnet 340 of the fourth embodiment. A peripheral portion of the field magnet 340 of the fourth embodiment as viewed in the axial direction has a polygonal shape. Thus, sides of the field magnet 340 as viewed in the axial direction form the non-abutment portions H. More specifically, a shape of the peripheral portion of the field magnet 340 as viewed in the axial direction has a regular polygonal shape having the same number of corners 340a as the magnetic poles, i.e., eight corners 340a in the fourth embodiment. Surfaces between the adjacent corners 340a in the circumferential direction form the non-abutment portions H. The field magnet 340 is arranged so that each of the corners 340a of the field magnet 340 is located at a circumferentially center position of each of the interpolar magnets 351. That is, the field magnet 340 is arranged so that the corners 340a of the field magnet 340 are adjacent to the center positions of the straight portions of the radially inner side flat surfaces of the interpolar magnets 351.

The operation of the brushless motor M will now be described.

When three-phase power supply voltage is applied to the three-phase windings 313u and 313v and 313w of the stator core 310 and the stator 302 generates a rotating field, the rotor 304 fixed to the rotation shaft 303 at the inner side of the stator 302 is rotated and driven by the rotating field.

Here, leakage (short circuit) magnetic flux in portions of the rotor 304 where the back surface magnets 350 are located is limited by the back surface magnets 350, and leakage (short circuit) magnetic flux in portions of the rotor 304 where the interpolar magnets 351 are located is limited by the interpolar magnets 351. Hence, the magnetic flux of the rotor 304 cooperates with the rotating field of the stator 302 to rotate and drive the rotor 304 with high efficiency.

The advantages of the fourth embodiment will now be described.

(15) The non-abutment portions H for partially blocking abutment with the auxiliary magnets G (back surface magnets 350 and interpolar magnets 351) are formed on the field magnet 340. Hence, the field magnet 340 can partially be spaced apart from the auxiliary magnets G (back surface magnets 350 and interpolar magnets 351), and it is possible to limit demagnetization of the auxiliary magnets G by the magnetic flux (short circuit magnetic flux) of the field magnet 340. If the auxiliary magnet G is polarized when these members are coupled, for example, it is possible to limit an opposing field produced by the field magnet 340 from being applied to the auxiliary magnets and it is possible to polarize the auxiliary magnets G in a satisfactory manner. When the field magnet 340 is adhered to the first core base 321 or the second core base 331, for example, it is possible for surplus adhesive to enter gaps formed by the non-abutment portions H. Hence, the brushless motor M can be stably operated with high efficiency.

(16) The peripheral portion of the field magnet 340 as viewed in the axial direction has a polygonal shape. Thus, the sides of the field magnet 340 as viewed in the axial direction form the non-abutment portions H. Hence, a simple structure easily limits demagnetization of the auxiliary magnets G by the magnetic flux of the field magnet 340.

(17) The peripheral portion of the field magnet 340 as viewed in the axial direction has the regular polygonal shape having the same number of the corners 340a as the magnetic poles, i.e., eight corners 340a. Hence, the corners 340a can be set close to the same circumferential positions of the interpolar magnets 351 like the fourth embodiment. Thus, the magnetic poles can be arranged in the rotor 304 in a circumferentially-well-balanced manner. Due to the regular polygonal shape, it becomes easy to produce the field magnet 340.

(18) Since the corners 340a of the field magnet 340 are located at central positions of the interpolar magnets 351 in the circumferential direction. Thus, the back surface magnets 350 may be spaced apart from the field magnet 340 as much as possible. Hence, it is possible to mainly limit demagnetization of the back surface magnets 350 by the magnetic flux of the field magnet 340. In addition, portions of the interpolar magnets 351 approach the field magnet 340. Hence, it is also possible to limit demagnetization of the interpolar magnets 351 by the magnetic flux of the field magnet 340. The magnetic poles can be arranged in the rotor 304 in a circumferentially-well-balanced manner.

The fourth embodiment may be changed as follows.

In the fourth embodiment, the corners 340a of the field magnet 340 are arranged at central positions of the interpolar magnets 351 in the circumferential direction. Instead, the corners 340a may be located at other positions.

Figure 24:
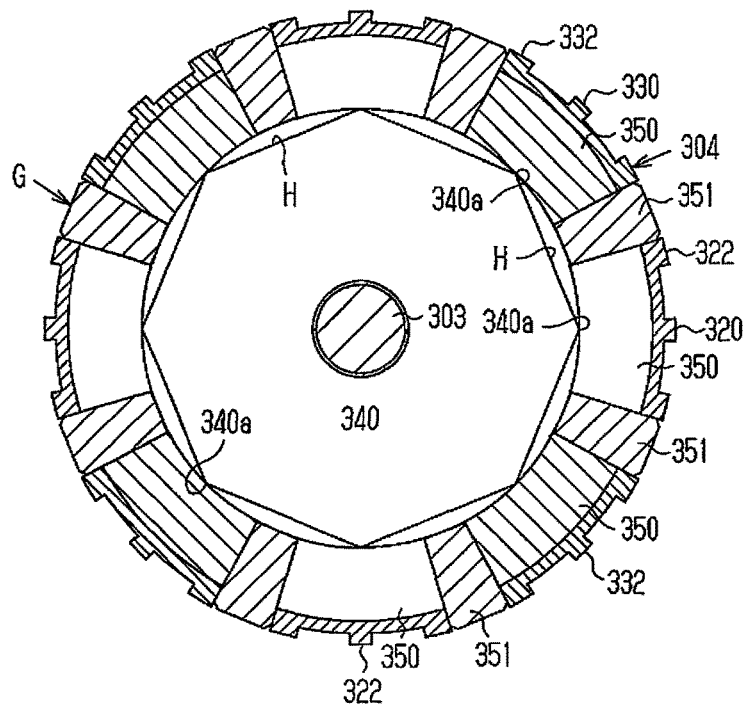
FIG. 24 is a partial cross-sectional view of a rotor in another example of the fourth embodiment.

As shown in FIG. 24 for example, the corners 340a of the field magnet 340 may be located at central positions of the back surface magnets 350 in the circumferential direction. Thus, the interpolar magnets 351 are spaced apart from the field magnet 340 as much as possible. Hence, it is possible to mainly limit demagnetization of the interpolar magnets 351 by the magnetic flux of the field magnet 340. In addition, portions of the back surface magnets 350 are located close to the field magnet 340. Hence, it is also possible to limit demagnetization of the back surface magnets 350 by the magnetic flux of the field magnet 340.

Figure 25:
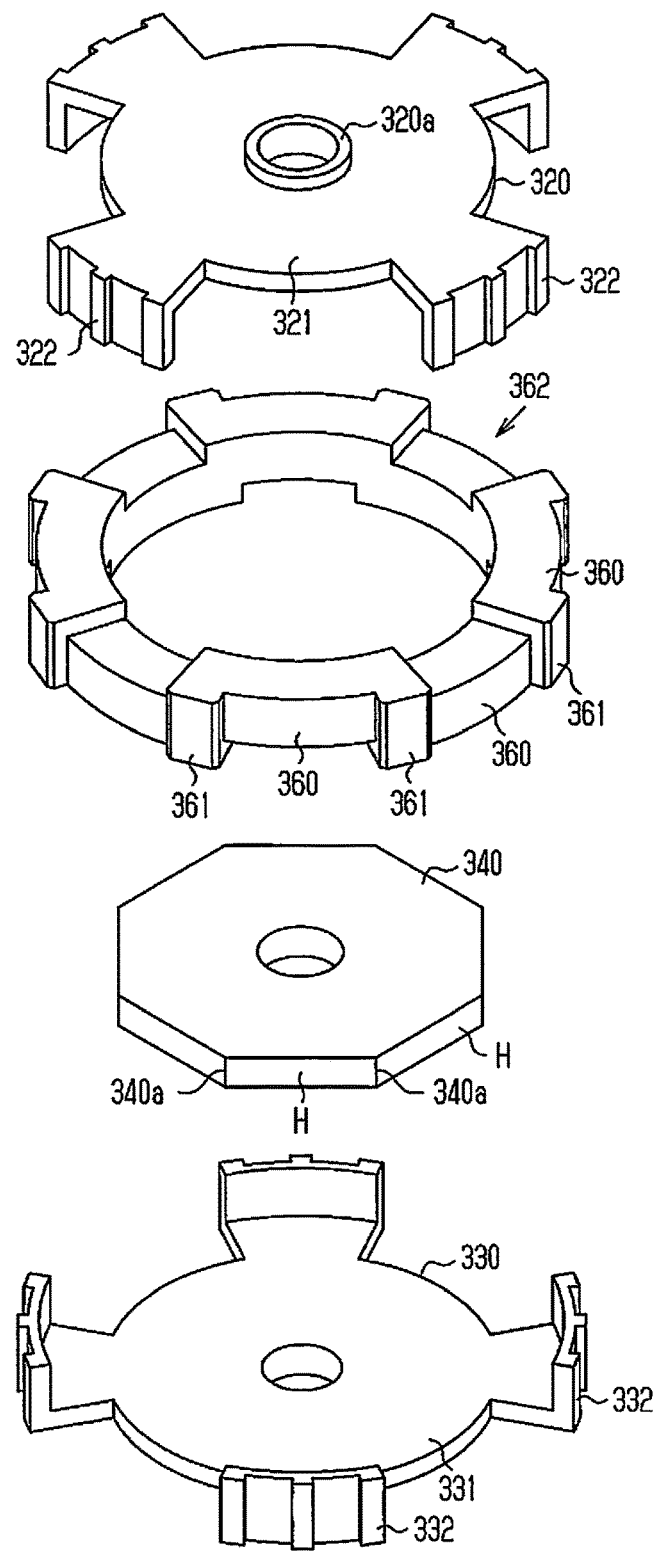
FIG. 25 is an exploded perspective view of a rotor in another example of the fourth embodiment.
Figure 26:
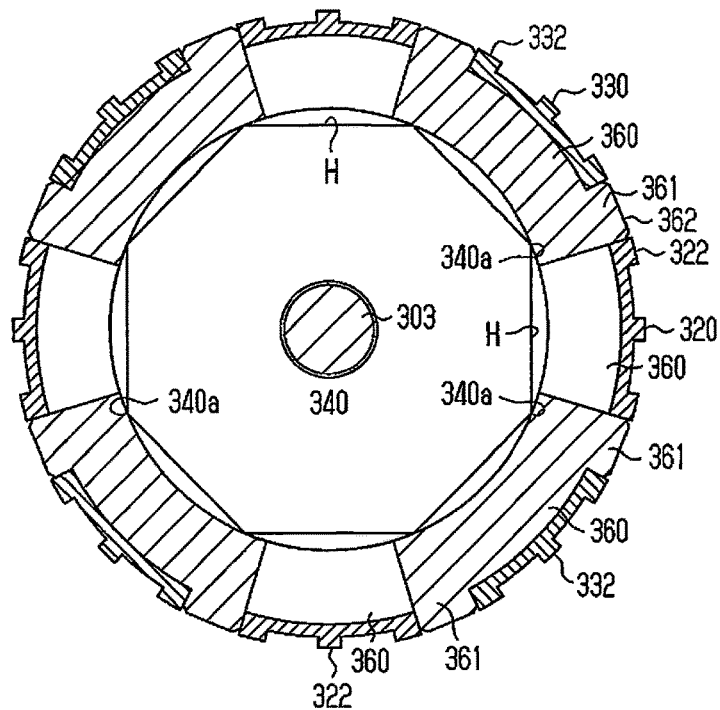
FIG. 26 is a partial cross-sectional view of a rotor in another example of FIG. 25.

In the fourth embodiment, the back surface magnet 350 and the interpolar magnet 351 are separate components. Instead, for example, the back surface magnets 350 and the interpolar magnets 351 may be changed to polar anisotropic magnets 362 serving as auxiliary magnets, as shown in FIGS. 25 and 26. The polar anisotropic magnets 362 includes back surface magnet portions 360 serving as back surface magnets and interpolar magnet portions 361 serving as interpolar magnets, which are integrally formed. The back surface magnet portions 360 and the interpolar magnet portions 361 are polarized so that they have the same functions. In this example, the corners 340a of the field magnet 340 are arranged at circumferentially center positions of the interpolar magnet portions 361. Thus, it is possible to reduce the number of parts of the rotor as compared with a rotor in which the back surface magnet 350 and the interpolar magnet 351 are separately formed.

Figure 27:
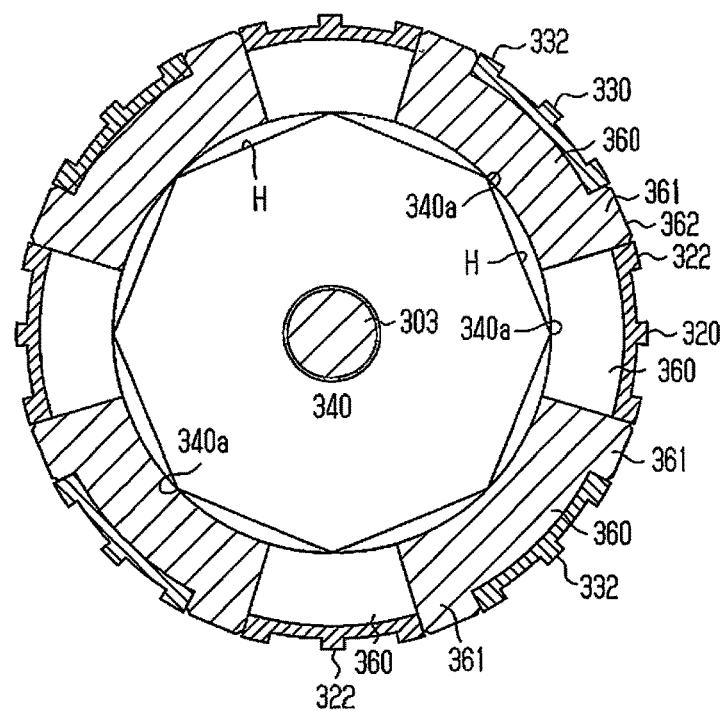
FIG. 27 is a partial cross-sectional view of a rotor in a modification of the example shown in FIG. 25.

Further, as shown in FIG. 27, in a structure using the polar anisotropic magnets 362, the corners 340a of the field magnet 340 may be located at the circumferentially center positions of the back surface magnet portions 360.

In the fourth embodiment, the present invention is embodied in the rotor 304 having eight magnetic poles. Instead, the present invention may be embodied in a rotor having a different number of magnetic poles.

Figure 28:
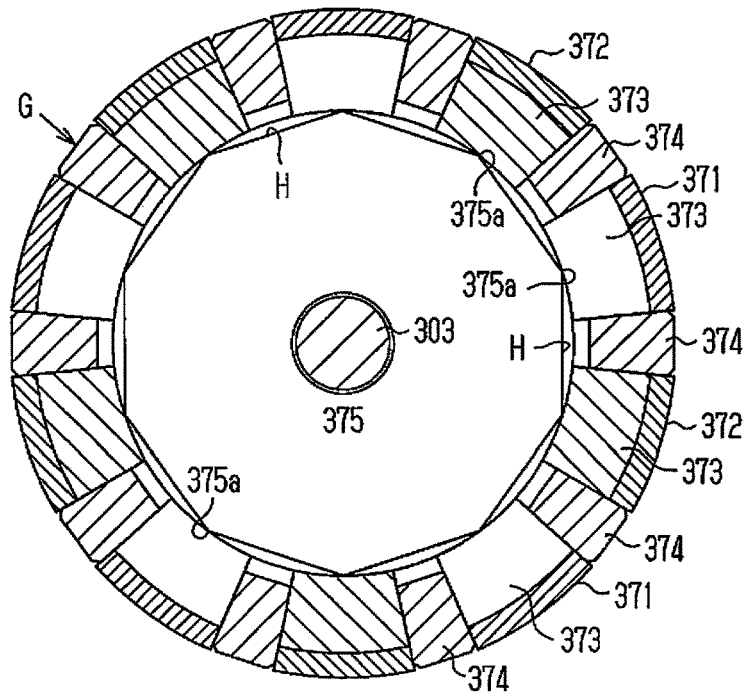
FIG. 28 is a partial cross-sectional view of a rotor in another example of the fourth embodiment.

For example, as shown in FIG. 28, the present invention may be embodied in a rotor having ten magnetic poles. More specifically, the rotor in this example includes a first rotor core 365 having five first claw-shaped magnetic poles 371, a second rotor core 366 having five second claw-shaped magnetic poles 372, back surface magnets 373 arranged on radially inner sides (back surfaces) of the first claw-shaped magnetic poles 371 and the second claw-shaped magnetic poles 372, and interpolar magnets 374 arranged between the first claw-shaped magnetic poles 371 and the second claw-shaped magnetic poles 372 in the circumferential direction. The auxiliary grooves 325 and 335 of the fourth embodiment are not formed in the first and second claw-shaped magnetic poles 371 and 372. A peripheral portion of the field magnet 375 as viewed in the axial direction has a regular polygonal shape with corners 375a and non-abutment portions H of the same number as that of the magnetic poles, i.e., ten corners 375a and ten non-abutment portions H. The corners 375a of the field magnet 375 are arranged at circumferentially center positions of the back surface magnets 373. This structure also obtains the above-described advantages. In this example, radial inner ends of the interpolar magnets 374 are located radially outward than radial inner ends of the back surface magnets 373 (outer circumferential surfaces of first and second core bases 321 and 331).

Figure 29:
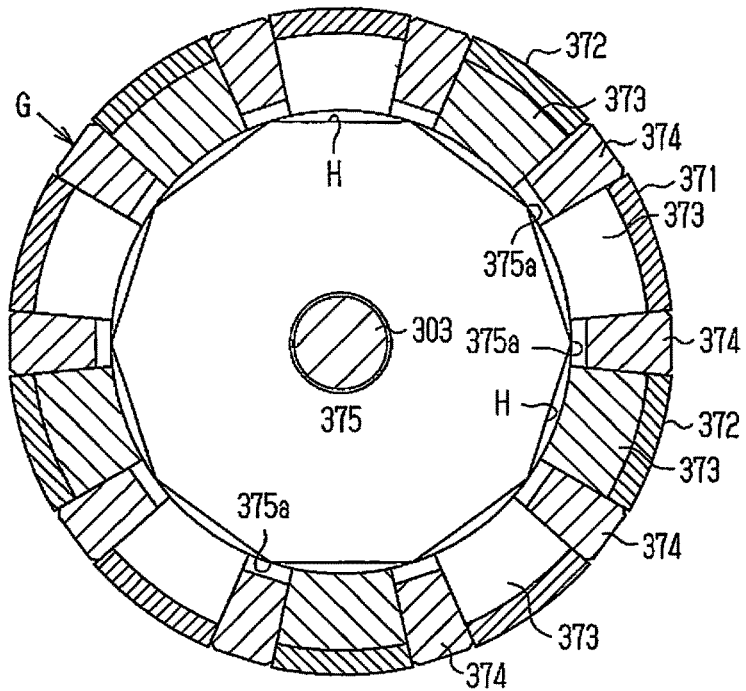
FIG. 29 is a partial cross-sectional view of a rotor in a modification of the example shown FIG. 28.

For example, as shown in FIG. 29, the corners 375a of the field magnet 375 in the above-described example (see FIG. 28) may be located at central positions of the interpolar magnets 374 in the circumferential direction.

Figure 30:
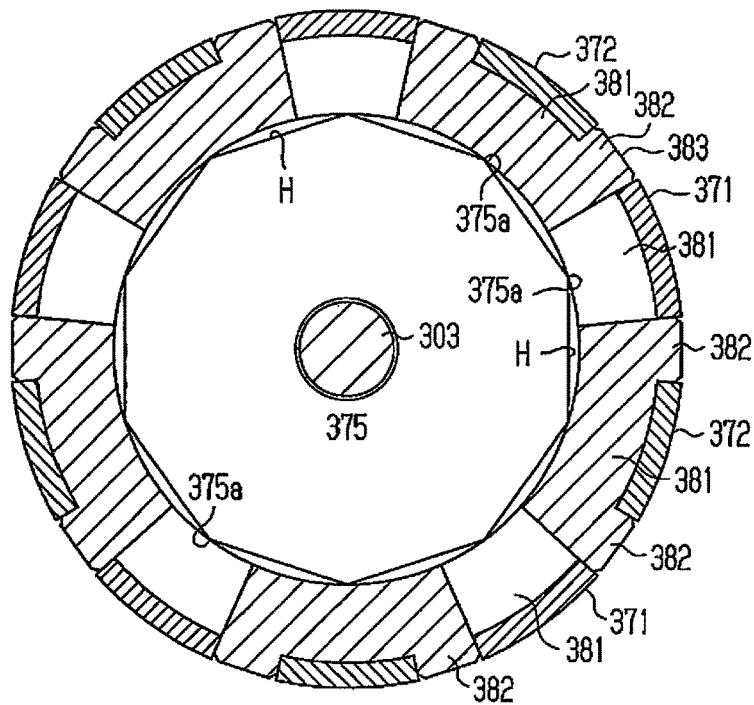
FIG. 30 is a partial cross-sectional view of a rotor in a modification of the example shown FIG. 28.

For example, as shown in FIG. 30, the back surface magnets 373 and the interpolar magnets 374 in the above different example (see FIG. 28) may be changed to polar anisotropic magnets 383 serving as auxiliary magnets. The polar anisotropic magnets 383 include back surface magnet portions 381 serving as back surface magnets and interpolar magnet portions 382 serving as interpolar magnets, which are integrally formed. The back surface magnet portions 381 and the interpolar magnet portions 382 are polarized to have the same functions. In this example, radial inner ends of the interpolar magnet portions 382 form a circular shape together with radial inner ends of the back surface magnet portions 381.

In the fourth embodiment, a peripheral portion of the field magnet 340 as viewed in the axial direction has a regular polygonal shape with corners 340a of the same number as the magnetic poles, i.e., eight corners 340a. The shape of the peripheral portion of the field magnet 340 may be changed into other polygonal shapes.

Figure 31:
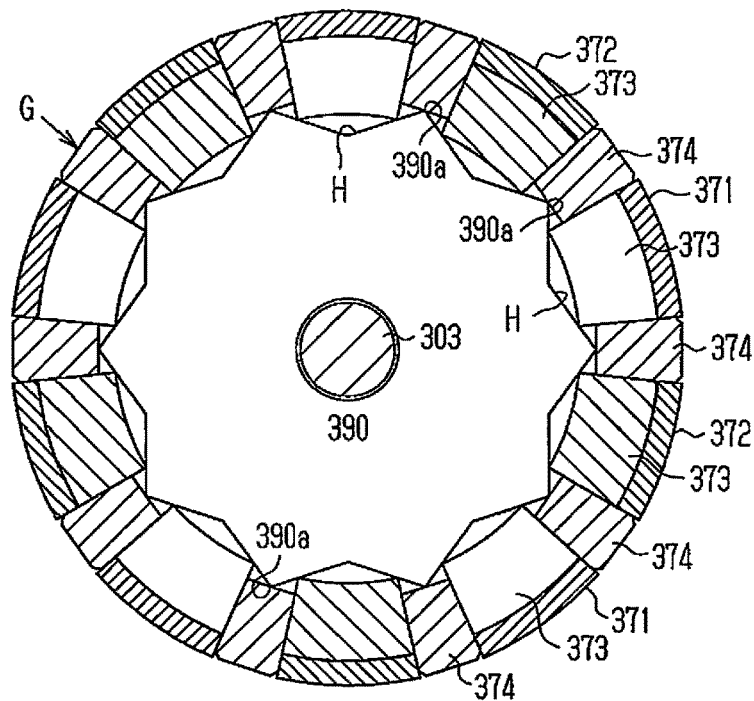
FIG. 31 is a partial cross-sectional view of a rotor in another example of the fourth embodiment.

The field magnet 340 may be changed into a field magnet 390 as shown in FIG. 31 for example. a peripheral portion of the field magnet 390 as viewed in the axial direction has a star polygonal shape with corners 390a of the same number (ten, in this example) as the magnetic poles. The corners 390a project radially outward. Recessed portions of the field magnet 390 as viewed in the axial direction form the non-abutment portions H. This example also limits demagnetization of the auxiliary magnets G from the magnetic flux of the field magnet 390 with a simple configuration. Further, since each corner 390a is arranged at the same circumferential position as the corresponding one of the interpolar magnets 374, the magnetic poles can be provided in the rotor 304 in a circumferentially-well-balanced manner.

In this example, each of the corners 390a projecting radially outward of the field magnet 390 are arranged at the circumferentially central position on the corresponding one of the interpolar magnets 374. In addition, the corners 390a are arranged radially outward from the radial inner ends of the back surface magnets 373. Thus, a volume of the field magnet 390 may be greater than a field magnet in which the corners 390a are not located radially outward from the radial inner ends of the back surface magnets 373.

The field magnet may be changed into a regular polygonal field magnet having corners of the different number from that of the magnetic poles. For example, the regular polygonal shape may be a regular polygonal shape having twice the number of corners of the magnetic poles or half the number of corners of the magnetic poles.

In the fourth embodiment, since the peripheral portion of the field magnet 340 as viewed in the axial direction has the polygonal shape, the sides of the field magnet 340 as viewed in the axial direction form the non-abutment portions H. Instead, the non-abutment portions may be changed into other configurations as long as portions for partially preventing abutment between the field magnet and the auxiliary magnets are formed in at least one of them.

The non-abutment portions may be changed as shown in FIGS. 32 to 34B, for example. In this example, the field magnet 375 in the above-described example (see FIG. 28) is changed into a field magnet 400 in which non-abutment portions H are formed partially in the axial direction. Since the members other than the field magnet 400 are substantially same as those of the above-described example (see FIG. 28), the same symbols are allocated to the same members, and detailed description thereof will be omitted.

In this example, the entire field magnet 400 is formed into a substantially disk shape, and the non-abutment portions H are formed only at positions corresponding to basal ends of the first and second claw-shaped magnetic poles 371 and 372 in the field magnet 400. More specifically, in portions of the field magnet 400 which are opposed to a first rotor core 365 (upper side in FIG. 33), the non-abutment portions H are formed at positions corresponding to a first claw-shaped magnetic pole 371, and in portions of the field magnet 400 which are opposed to a second rotor core 366, the non-abutment portions H are formed at positions corresponding to a second claw-shaped magnetic pole 372. The non-abutment portions H are chamfered portions formed by flatly chamfering the corners of the field magnet 400.

Thus, the non-abutment portions H are formed at the positions corresponding to the basal ends of the first and second claw-shaped magnetic poles 371 and 372. This reduces the opposing field at a location where the magnetic flux of the field magnet 400 applies a large opposing field to the auxiliary magnets G (especially back surface magnets 373). In this example, it is possible to limit the auxiliary magnets G from being largely demagnetized at such locations. That is, it is understood that short circuit magnetic flux is generated by magnetic flux of the field magnet 400 at the locations corresponding to the basal ends of the first and second claw-shaped magnetic poles 371 and 372 (locations where back surface magnets 373 are arranged). However, gaps K formed at those locations, which have a large magnetic resistance, limit generation of the short circuit magnetic flux. Thus, it is possible to limit the auxiliary magnets G (back surface magnets 373) from being largely demagnetized by the short circuit magnetic flux.

The non-abutment portions H are formed only at positions corresponding to the basal ends of the first and second claw-shaped magnetic poles 371 and 372. Hence, it is possible to limit, as much as possible, reduction in the magnet amount due to formation of the non-abutment portions H, and to limit demagnetization especially at locations where demagnetization is apt to occur.

The non-abutment portions H are the chamfered portions. Hence, it is possible to limit cracking and chipping at locations where the non-abutment portions are formed as compared with a field magnet in which a non-abutment portion H is a stepped portion.

Figure 34A:
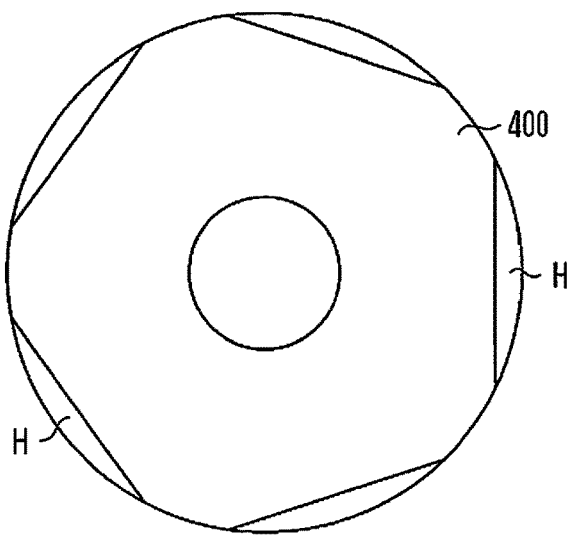
FIG. 34A is a plan view of a field magnet in the example shown FIG. 32.
Figure 34B:
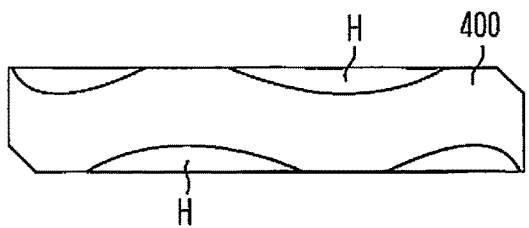
FIG. 34B is a side view of the field magnet in the example shown FIG. 32.
Figure 35A:
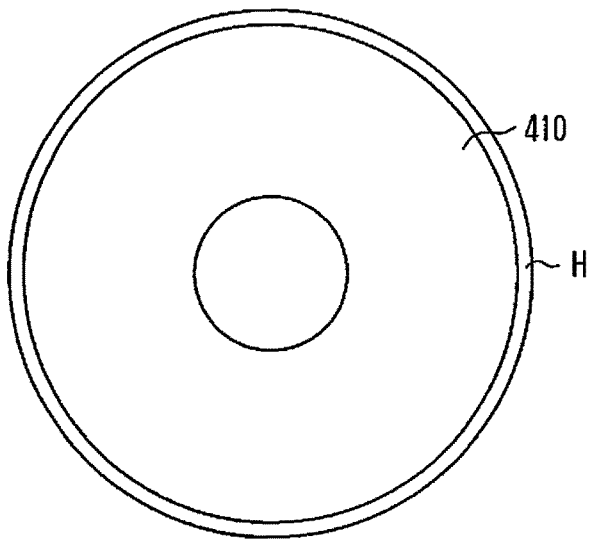
FIG. 35A is a plan view of a field magnet in a modification of the example shown FIG. 32.
Figure 35B:
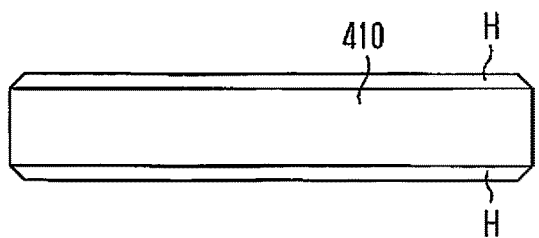
FIG. 35B is a side view of the field magnet in the example shown FIG. 35A.

Further, the field magnet 400 of the above described example (see FIGS. 32 to 34B) may be changed as shown in FIGS. 35A and 35B, for example. In FIGS. 35A and 35B, a field magnet 410 includes non-abutment portions H, which are chamfered portions formed by chamfering an entire peripheral direction of the field magnet.

Figure 32:
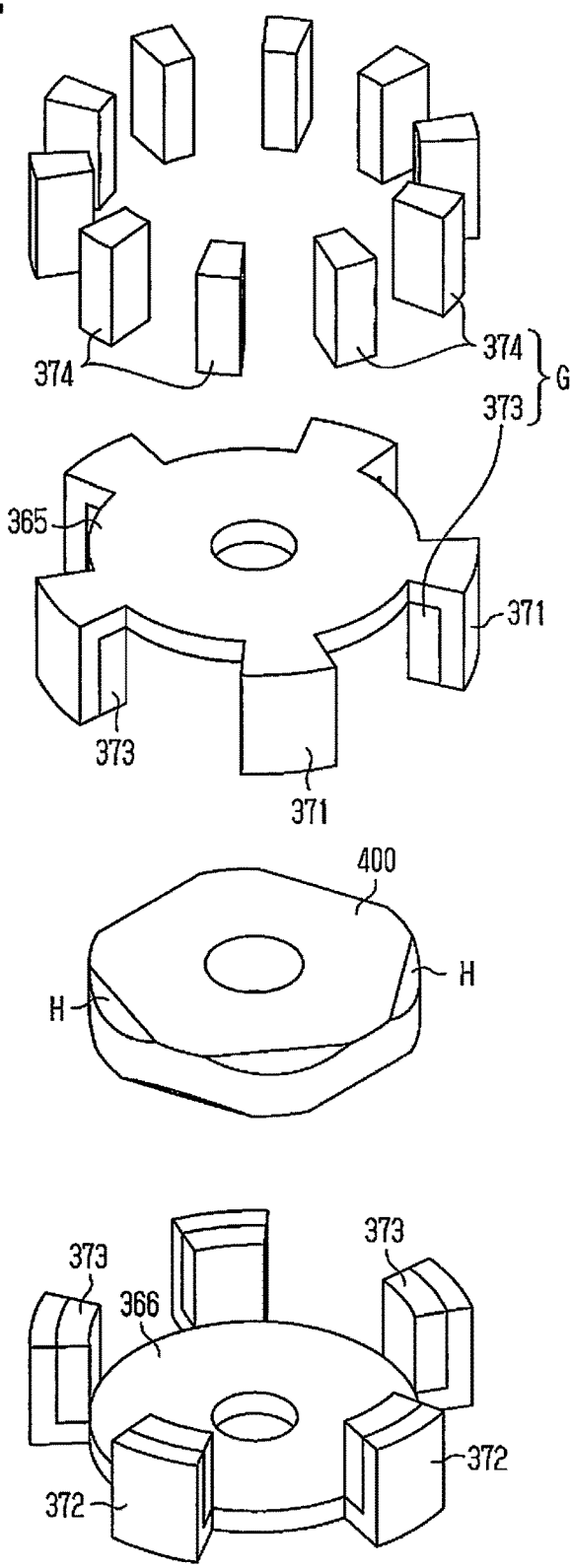
FIG. 32 is an exploded perspective view of a rotor in another example of the fourth embodiment.
Figure 33:
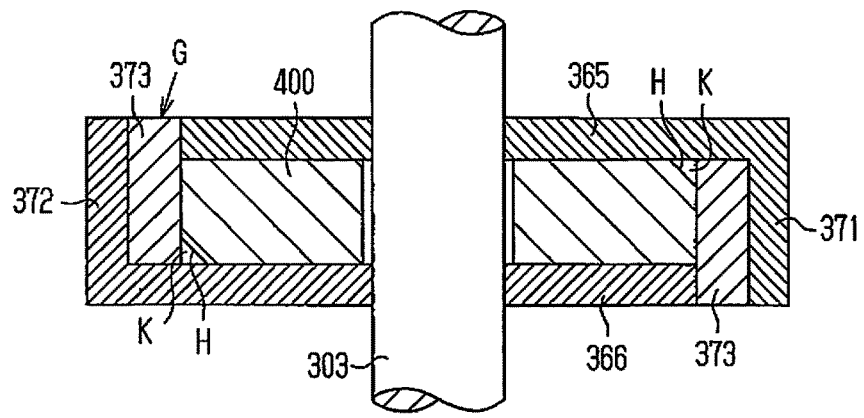
FIG. 33 is a partial cross-sectional view of the rotor shown in FIG. 32.
Figure 36:
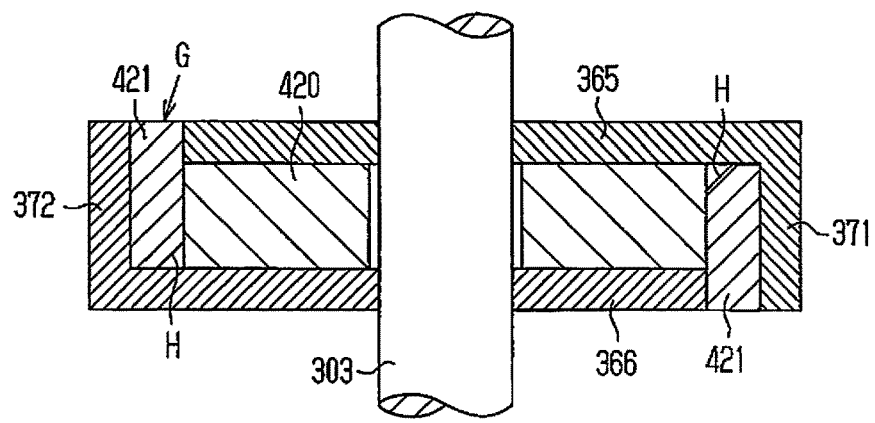
FIG. 36 is a partial cross-sectional view of a rotor in a modification of the example shown FIG. 32.
Figure 37:
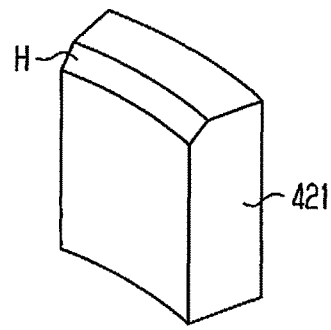
FIG. 37 is a perspective view of a back surface magnet of the example shown FIG. 36.

The non-abutment portions H may be changed as shown in FIGS. 36 and 37 for example. As shown in FIGS. 36 and 37, the non-abutment portions H are formed in back surface magnets 421 serving as the auxiliary magnets and not in a substantially disk-shaped field magnet 420. Each of the back surface magnets 421 in this example has a substantially sector shape as viewed in the axial direction. The non-abutment portions H are formed on the back surface magnets 421 only at positions corresponding to basal ends of the first and second claw-shaped magnetic poles 371 and 372. As shown in FIG. 37, the non-abutment portions H in this example are chamfered portions formed by chamfering corners of the back surface magnets 421 into curved surfaces along curves of the back surface magnets 421. This structure also has substantially the same advantages as the above example (FIGS. 32 to 34).

Figure 38:
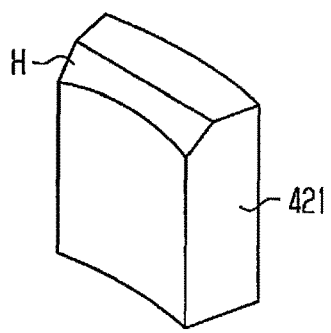
FIG. 38 is a perspective view of a back surface magnet in a modification of the example shown FIG. 32.
Figure 39:
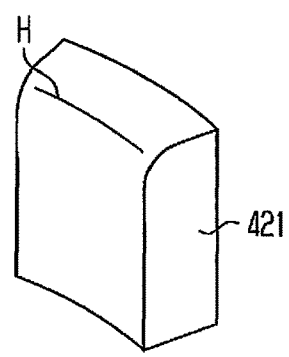
FIG. 39 is a perspective view of a back surface magnet in a modification of the example shown FIG. 32.
Figure 40:
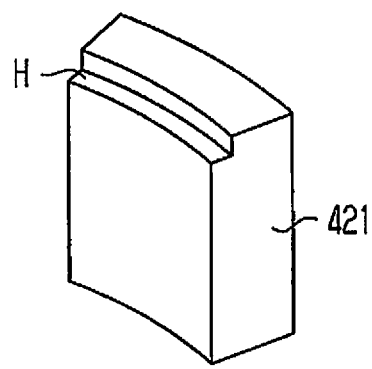
FIG. 40 is a perspective view of a back surface magnet in a modification of the example shown FIG. 32.

Further, the non-abutment portions H in the back surface magnets 421 of the above example (see FIGS. 36 and 37) may be chamfered portions formed by flatly chamfering corners as shown in FIG. 38, or may be chamfered portions formed by chamfering corners into round shapes as shown in FIG. 39. For example, the non-abutment portions H may be stepped portions as shown in FIG. 40.

Figure 41:
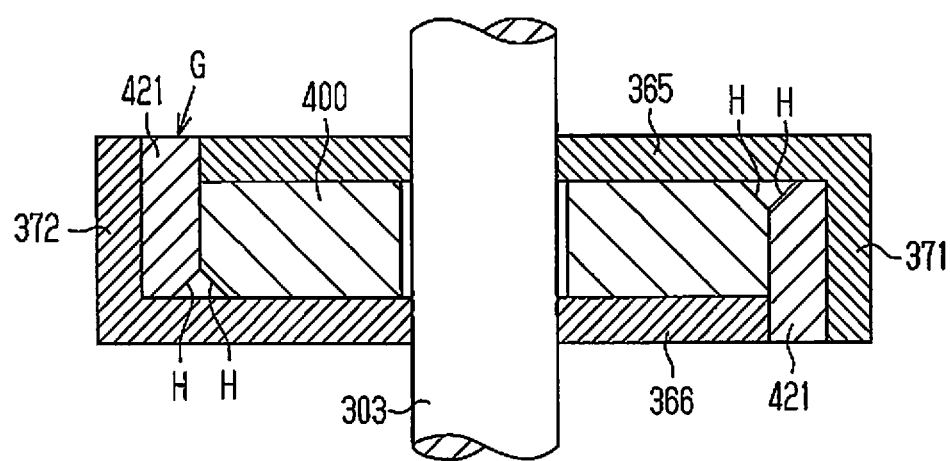
FIG. 41 is a partial cross-sectional view of a rotor in another example of the fourth embodiment.

As shown in FIG. 41, for example, the non-abutment portions H for partially blocking abutment between the field magnet 400 and the back surface magnets 421 may be formed in both the field magnet 400 and back surface magnets 421.

A fifth embodiment of a motor will now be described with reference to FIGS. 42 to 48.

Figure 42:
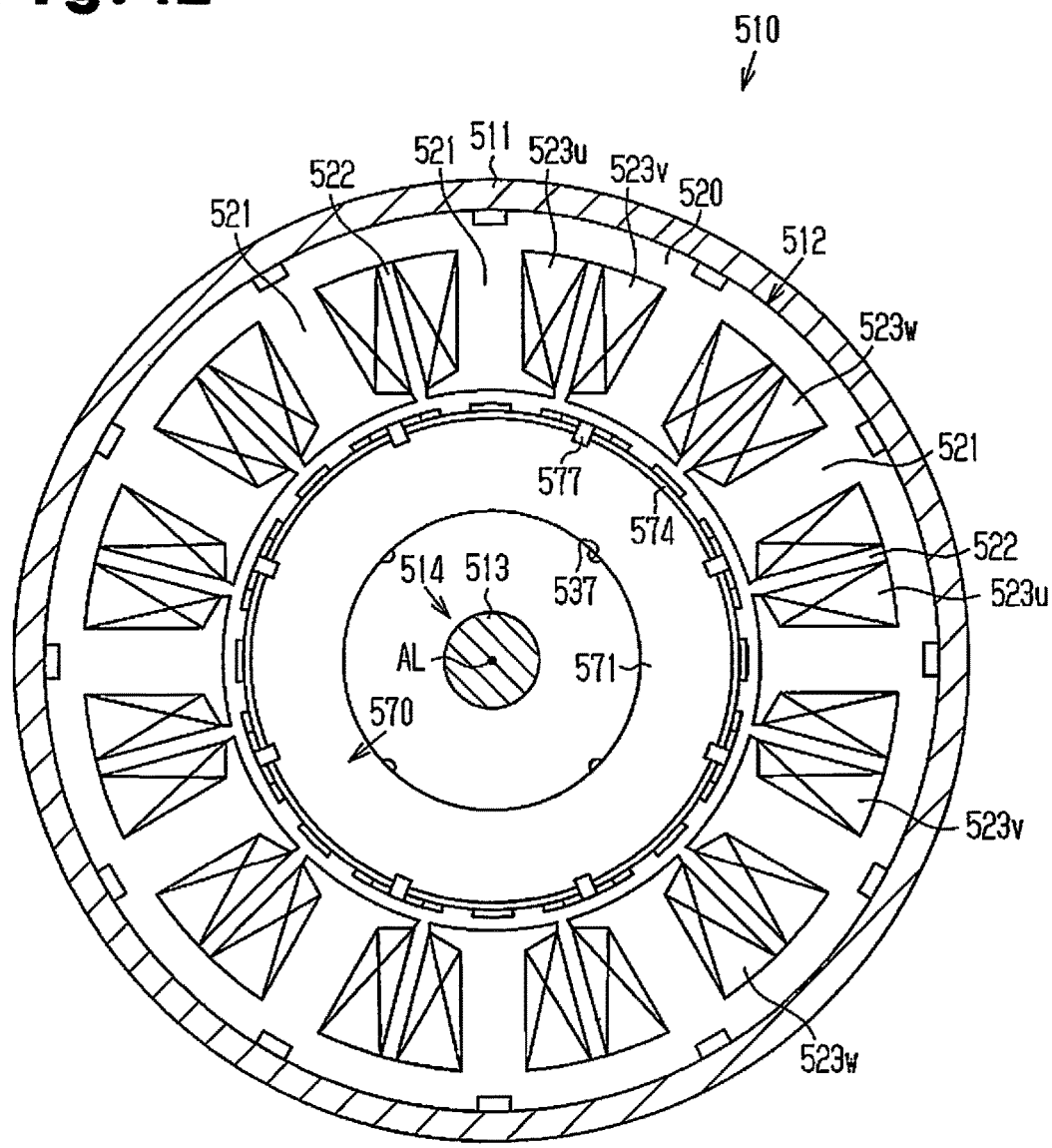
FIG. 42 is a cross-sectional view of a brushless motor according to a fifth embodiment of the present invention as viewed in the axial direction.

As shown in FIG. 42, a brushless motor 510 includes a motor housing 511, a stator 512 fixed to an inner circumferential surface of the motor housing 511, and a rotor 514 of a so-called Lundell type structure located at the inner side of the stator 512. The rotor 514 of the Lundell type structure is fixed to a rotation shaft 513 and integrally rotates with the rotation shaft 513. The rotation shaft 513 is a non-magnetic stainless-steel shaft, and the rotation shaft 513 is rotatably supported on the motor housing 511 by bearings (not shown) arranged in the motor housing 511.

As shown in FIG. 42, the stator 512 has a cylindrical stator core 520, and an outer circumferential surface of the stator core 520 is fixed to an inner surface of the motor housing 511. A plurality of teeth 521 are arranged on the inner side of the stator core 520. The teeth 521 extend in the axial direction and are arranged at an equal pitch in the circumferential direction. The teeth 521 extend radially inward. Each of the teeth 521 is T-shapes and has an inner circumferential surface in the radial direction that is an arcuate surface extending in the axial direction about a center axis AL of the rotation shaft 513.

As shown in FIG. 42, slots 522 are formed between the teeth 521. In the fifth embodiment, the number of the teeth 521 is 12, and the number of the slots 522 is also 12. Three-phase windings, i.e., U-phase windings 523$u$, V-phase windings 523$v$, and W-phase windings 523$w$ are wound around the 12 teeth 521 in this order in the circumferential direction in a concentrated winding manner.

Three-phase power supply voltage is applied to the wound three-phase windings 523$u$, 523$v$ and 523$w$ so that the stator 512 forms a rotating field to rotate the rotor 514 fixed to the rotation shaft 513 located at the inner side of the stator 512 in a forward direction (clockwise direction in FIG. 42) and a reverse direction (counterclockwise direction in FIG. 42).

Figure 43:
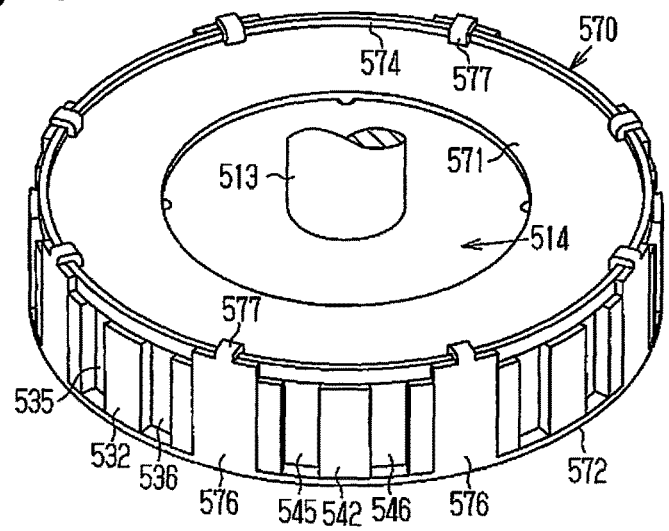
FIG. 43 is a perspective view of a rotor shown in FIG. 42 to which a rotor cover is attached.
Figure 44:
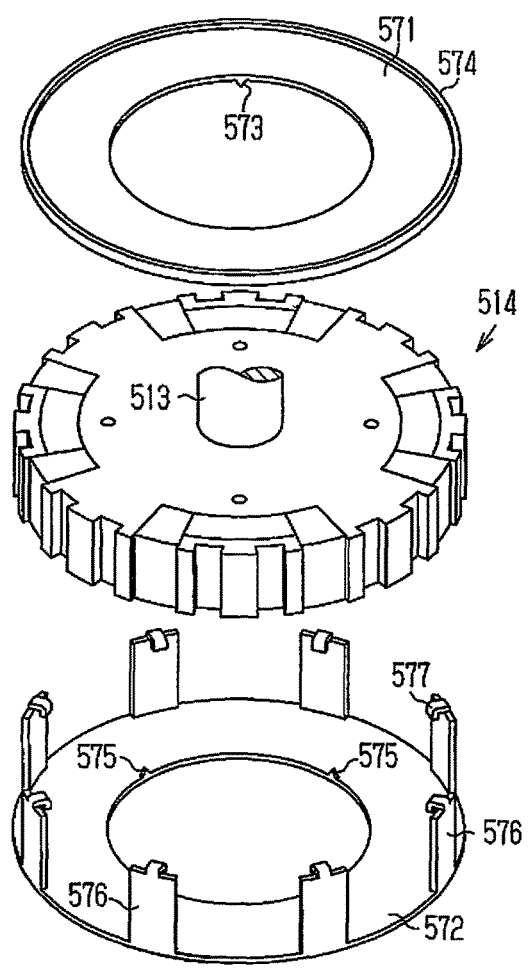
FIG. 44 is an exploded perspective view of the rotor cover shown in FIG. 43.

As shown in FIGS. 45 to 48, the rotor 514 located at the inner side of the stator 512 includes first and second rotor cores 530 and 540 and a field magnet 550. As shown in FIGS. 43 and 44, a rotor cover 570 is attached to the rotor 514, which includes the first and second rotor cores 530 and 540 and the field magnet 550.

Figure 48:
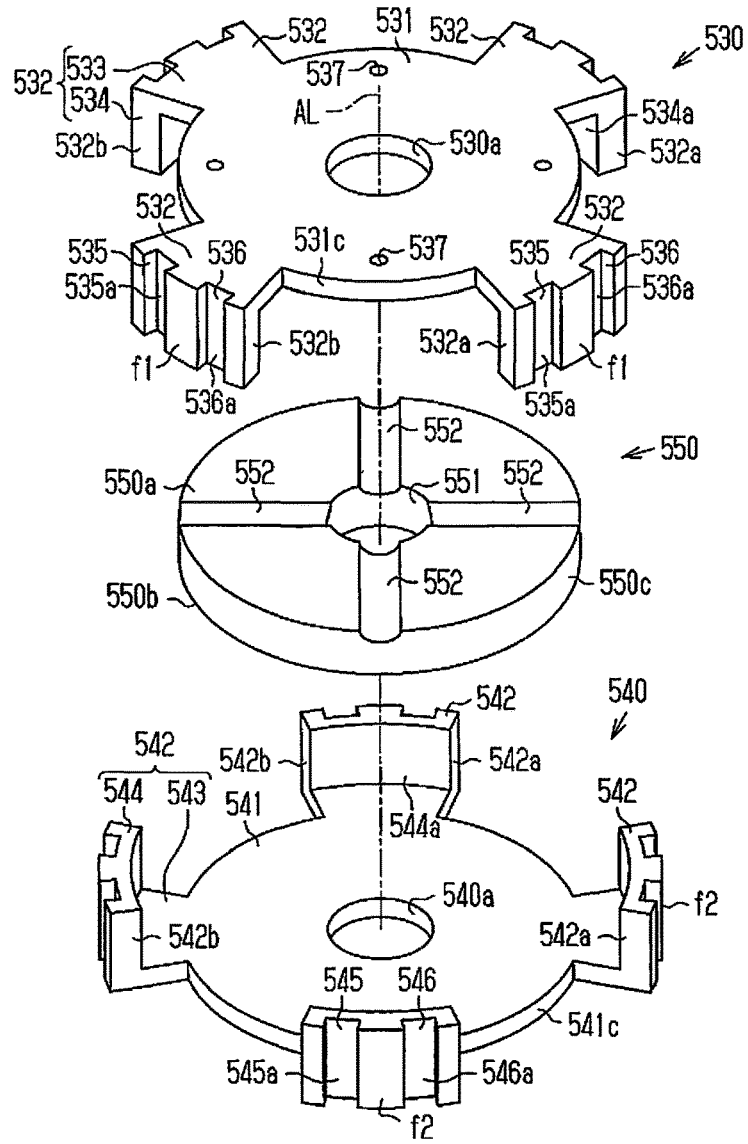
FIG. 48 is an exploded perspective view of the rotor shown in FIG. 47 from which an interpolar auxiliary magnet and a back surface auxiliary magnet are omitted.

As shown in FIG. 48, the first rotor core 530 is made of soft magnetic material, and is formed from an electromagnetic steel sheet in the fifth embodiment. The first rotor core 530 includes a disk-shaped first core base 531 having a through hole 530$a$. The rotation shaft 513 is inserted through and fixed to the through hole 530$a$. An outer circumferential surface 531$c$ of the first core base 531 is provided with a plurality of (four in fifth embodiment) first claw-shaped magnetic poles 532 at substantially equal distances. The first claw-shaped magnetic poles 532 project radially outward and extend in the axial direction. Here, in each of the first claw-shaped magnetic poles 532, a portion projecting radially outward from the outer circumferential surface 531$c$ of the first core base 531 is referred to as a first base portion 533, and a distal end bent in the axial direction is referred to as a first magnetic pole portion 534.

Circumferential end surfaces 532$a$ and 532$b$ of each of the first claw-shaped magnetic poles 532 are radially extending flat surfaces (which are not inclined in radial direction as viewed from axial direction). An angle of the first claw-shaped magnetic pole 532 in the circumferential direction, i.e., an angle between both the circumferential end surfaces 532a and 532b is set to be smaller than an angle of a gap between adjacent ones of the first claw-shaped magnetic poles 532 in the circumferential direction.

A cross-section orthogonal to the axial direction of a radial outer surface f1 of each of the first magnetic pole portions 534 has an arcuate surface extending about the center axis AL of the rotation shaft 513. The radial outer surface f1 has two grooves, i.e., a first auxiliary groove 535 and a second auxiliary groove 536. The first auxiliary groove 535 and the second auxiliary groove 536 are formed in symmetric positions with respect to a straight line extending from center axis AL of the rotation shaft 513 through an intermediate position of the first magnetic pole portions 534 in the circumferential direction. The first auxiliary groove 535 and the second auxiliary groove 536 are formed so that an angle about the center axis AL of the rotation shaft 513 formed by the first auxiliary groove 535 and the second auxiliary groove 536 conforms with a cycle $\phi$ (=15°) of the cogging torque.

Figure 45A:
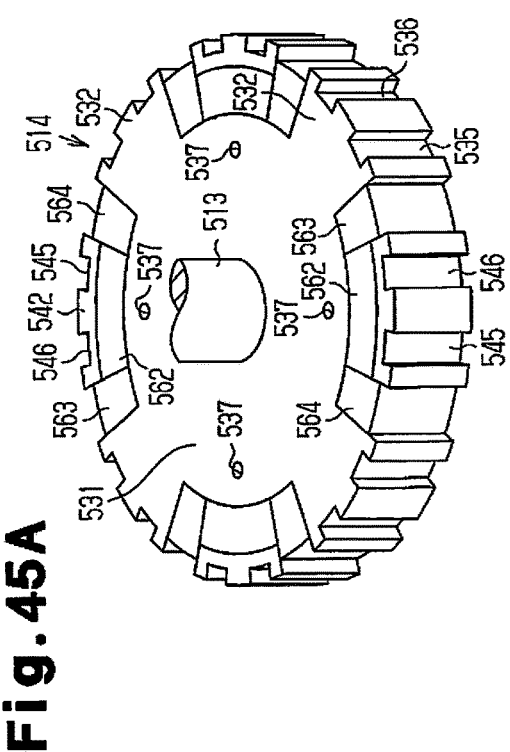
FIG. 45A is a perspective view of the rotor shown in FIG. 44 as viewed from a first rotor core-side.

As shown in FIGS. 45A and 48, four positioning locking holes 537 are arranged at equal angular intervals in a non-opposed surface 531b of the first core base 531, which is the backside surface of an opposed surface 531a on a circle about the center axis AL. The four positioning locking holes 537 are formed between the first claw-shaped magnetic poles 532 formed on the adjacent first core base 531.

As shown in FIG. 48, the second rotor core 540 is made of the same material and has the same shape as the first rotor core 530. The second rotor core 540 has a disk-shaped second core base 541 including a through hole 540a, and the rotation shaft 513 is fitted into and fixed to the through hole 540a. A plurality of (four in the fifth embodiment) second claw-shaped magnetic poles 542 are arranged on an outer circumferential surface 541c of the second core base 541 at substantially equal intervals. Each of the second claw-shaped magnetic poles 542 projects radially outward and extends in the axial direction. In each of the second claw-shaped magnetic poles 542, a portion extending radially outward from the outer circumferential surface 541c of the second core base 541 is referred to as a second base portion 543, and a distal end which is bent in the axial direction is referred to as a second magnetic pole portion 544.

The circumferential end surfaces 542a and 542b of each of the second claw-shaped magnetic poles 542 is a flat surface that extends in the radial direction (not inclined in radial direction as viewed from axial direction). An angle of the second claw-shaped magnetic pole 542 in the circumferential direction, i.e., an angle between both of the circumferential end surfaces 542a and 542b is set to be smaller than an angle of a gap between adjacent ones of the second claw-shaped magnetic poles 542 in the circumferential direction.

A cross-section of a radial outer surface f2 of each of the second magnetic pole portions 544 orthogonal to the axial direction has the shape of an arcuate surface extending about the center axis AL of the rotation shaft 513. The radial outer surface f2 has two grooves, i.e., a first auxiliary groove 545 and a second auxiliary groove 546. The first auxiliary groove 545 and the second auxiliary groove 546 are formed in symmetric positions with respect to a straight line extending from center axis AL of the rotation shaft 513 and extending through an intermediate position of the second magnetic pole portion 544 in the circumferential direction. The first auxiliary groove 545 and the second auxiliary groove 546 are formed so that an angle between the first auxiliary groove 545 and the second auxiliary groove 546 about the center axis AL of the rotation shaft 513 conforms with a cycle $\phi$ (=15°) of the cogging torque.

Figure 45B:
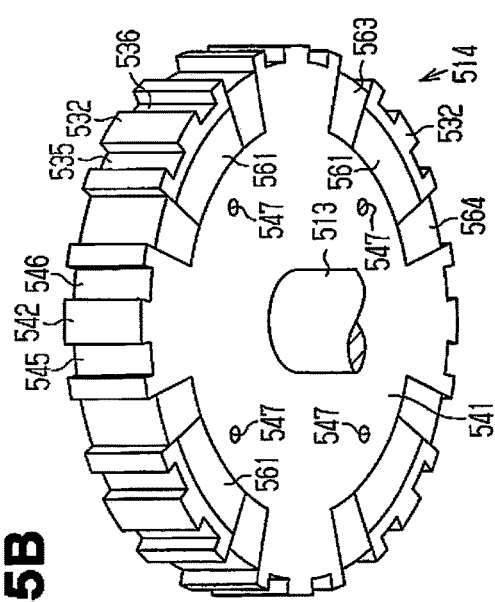
FIG. 45B is a perspective view of the rotor shown in FIG. 44 as viewed from a second rotor core-side.

As shown in FIG. 45B, four positioning locking holes 547 are formed at equal angular intervals on a circle extending about the center axis AL in a non-opposed surface 541b of the second core base 541, which is the backside surface of an opposed surface 541a. The four positioning locking holes 547 are formed between the adjacent second claw-shaped magnetic poles 542 on the second core base 541.

The second claw-shaped magnetic poles 542 of the second rotor core 540 are located between the corresponding first claw-shaped magnetic poles 532. Here, the second rotor core 540 is coupled to the first rotor core 530 so that the field magnet 550 (see FIG. 47) is arranged (sandwiched) between the first core base 531 and the second core base 541 in the axial direction.

Figure 47:
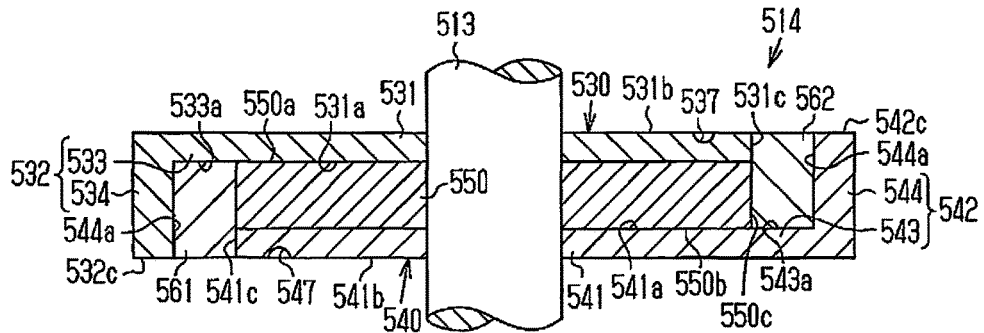
FIG. 47 is a combined cross-sectional view taken along line a-o-b in FIG. 46.

As shown in FIGS. 47 and 48, the field magnet 550 is a disk-shaped permanent magnet made of a neodymium magnet.

As shown in FIG. 48, a through hole 551 is formed in a central position of the field magnet 550, and the rotation shaft 513 extends through the through hole 551. One side surface 550a of the field magnet 550 in the direction of the axis AL abuts against the opposed surface 531a of the first core base 531, and the other side surface 550b of the field magnet 550 in the direction of the axis AL abuts against the opposed surface 541a of the second core base 541, and the field magnet 550 is sandwiched and fixed between the first rotor core 530 and the second rotor core 540.

The outer diameter of the field magnet 550 conforms with the outer diameters of the first and second core bases 531 and 541, and the field magnet 550 is set to have a predetermined thickness. That is, as shown in FIG. 47, when the field magnet 550 is located between the first rotor core 530 and the second rotor core 540, a distal end surface 532c of the first claw-shaped magnetic poles 532 (first magnetic pole portion 534) and the non-opposed surface 541b of the second core base 541 are flush with each other. In the same manner, a distal end surface 542c of the second claw-shaped magnetic pole 542 (second magnetic pole portion 544) and the non-opposed surface 531b of the first core base 531 are flush with each other. Further, an outer circumferential surface 550c of the field magnet 550 and outer circumferential surfaces 531c and 541c of the first and second core bases 531 and 541 are flush with each other.

As shown in FIG. 47, the field magnet 550 is magnetized in the axial direction. More specifically, the field magnet 550 is magnetized so that the first rotor core 530 functions as the north pole (first magnetic pole) and the second rotor core 540 functions as the south pole (second magnetic pole). Therefore, due to the field magnet 550, the first claw-shaped magnetic poles 532 of the first rotor core 530 function as north poles (first magnetic poles) and the second claw-shaped magnetic pole 542 of the second rotor core 540 functions as the south pole (second magnetic pole).

Therefore, the rotor 514 of the fifth embodiment is of a so-called Lundell type structure using the field magnet 550. In the rotor 514, the first claw-shaped magnetic poles 532 serving as the north poles and the second claw-shaped magnetic poles 542 serving as south poles are alternately arranged in the circumferential direction. The number of magnetic poles of the rotor 514 is eight (number of pairs of poles is four).

Figure 46:
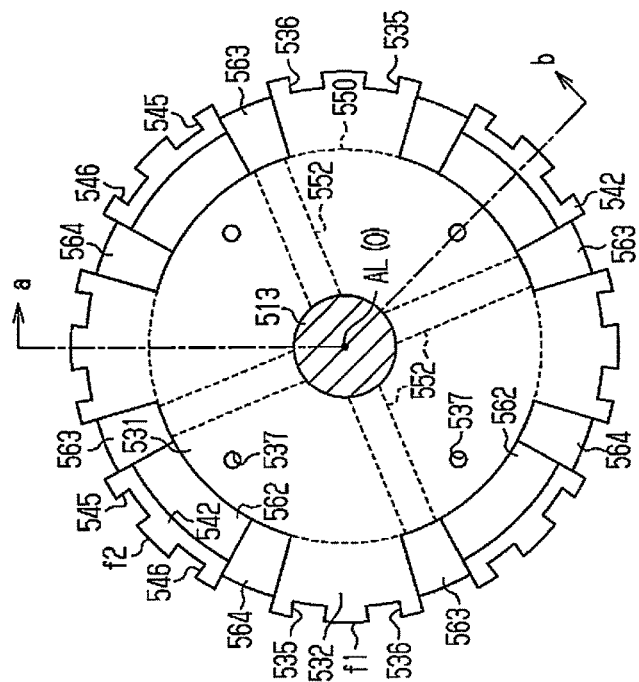
FIG. 46 is a front view of the rotor shown in FIG. 45 as viewed in the axial direction.

As shown in FIG. 48, a plurality of (four in fifth embodiment) dividing grooves 552 which are recessed in the axial direction and extend along the radial direction are formed in the one side surface 550a of the field magnet 550. The plurality of dividing grooves 552 are arranged at equal angular intervals in the circumferential direction, and the number of the dividing grooves 552 is same as the number of pairs of poles. Each of the dividing grooves 552 is formed so that its cross-section extending along the axis AL direction has a semi-circular or semi-elliptical shape. As shown in FIG. 46, the field magnet 550 of the fifth embodiment is sandwiched between the first and second rotor cores 530 and 540 so that the dividing grooves 552 are arranged at positions that are not overlapped with the first and second claw-shaped magnetic poles 532 and 542 as viewed from the radial direction, for example.

As shown FIG. 47, a first back surface auxiliary magnet 561 is arranged in a space defined by a back surface 534a (radially inner surface) of the first magnetic pole portion 534, the outer circumferential surface 541c of the second core base 541, the outer circumferential surface 550c of the field magnet 550, and a surface 533a, i.e., the surface of the first base portion 533 closer to the second rotor core 540. The first back surface auxiliary magnet 561 has a substantially rectangular parallelepiped shape, and a cross-section of the first back surface auxiliary magnet 561 orthogonal to the axial direction has a sector shape. The first back surface auxiliary magnet 561 is magnetized in the radial direction so that a portion that abuts against the back surface 534a of the first claw-shaped magnetic poles 532 (first magnetic pole portion 534) becomes the north pole, which is the same magnetic pole as the first claw-shaped magnetic poles 532, and so that a portion that abuts against the second core base 541 becomes the south pole, which is the same magnetic pole as the second core base 541.

As shown in FIG. 47, a second back surface auxiliary magnet 562 is arranged in a space defined by a back surface 544a (radially inner surface) of the second magnetic pole portion 544, the outer circumferential surface 531c of the first core base 531, the outer circumferential surface 550c of the field magnet 550, and a surface 543a, i.e., the surface of the second base portion 543 closer to the first rotor core 530. The second back surface auxiliary magnet 562 has a substantially rectangular parallelepiped shape, and a cross-section of the second back surface auxiliary magnet 562 orthogonal to the axial direction has a sector shape. The second back surface auxiliary magnet 562 is magnetized in the radial direction so that a portion that abuts against the back surface 544a of the second claw-shaped magnetic poles 542 (second magnetic pole portion 544) becomes the south pole, which is the same magnetic pole as that of the second claw-shaped magnetic poles 542, and so that a portion that abuts against the first core base 531 becomes the north pole, which is the same magnetic pole as that of the first core base 531.

As shown in FIG. 46, first and second interpolar auxiliary magnets 563 and 564 are located between the first claw-shaped magnetic poles 532 and the second claw-shaped magnetic poles 542 in the circumferential direction. The first and second interpolar auxiliary magnets 563 and 564 have substantially rectangular parallelepiped shapes, and cross-sections of the first and second interpolar auxiliary magnets 563 and 564 orthogonal to the axial direction have sector shapes.

The first interpolar auxiliary magnet 563 is located between a flat surface defined by one circumferential end surfaces 532a of the first claw-shaped magnetic poles 532 and a circumferential end surface of the first back surface auxiliary magnet 561 and a flat surface defined by the other circumferential end surface 542b of the second claw-shaped magnetic poles 542 and a circumferential end surface of the second back surface auxiliary magnet 562.

In the same manner, the second interpolar auxiliary magnet 564 is located between a flat surface defined by one circumferential end surface 532b of the first claw-shaped magnetic poles 532 and a circumferential end surface of the first back surface auxiliary magnet 561 and a flat surface defined by the other circumferential end surface 542b of the second claw-shaped magnetic poles 542 and a circumferential end surface of the second back surface auxiliary magnet 562.

The first and second interpolar auxiliary magnets 563 and 564 are magnetized in the circumferential direction to have the same magnetic poles as the first and second claw-shaped magnetic poles 532 and 542 (portions of the magnet 563 and 564 closer to the first claw-shaped magnetic poles 532 become north poles, and portions of the magnet 563 and 564 closer to the second claw-shaped magnetic poles 542 become south poles).

The rotor cover 570 is attached to the rotor 514 which is assembled as described above.

As shown in FIGS. 43 and 44, the rotor cover 570 includes a first plate 571 located in the vicinity of the first rotor core 530 and a second plate 572 located in the vicinity of the second rotor core 540. Both of the first plate 571 and second plate 572 are made of non-magnetic material.

The first plate 571 has the form of an annular plate. An inner diameter of the first plate 571 is set to be equal to a diameter of a circle extending about the center axis AL, which extends through a center position of the four positioning locking holes 537 formed in the non-opposed surface 531b of the first core base 531. Four first locking claws 573 are formed on an inner peripheral edge of the first plate 571 at substantially equal intervals, and the first locking claws 573 extend toward the first rotor core 530. An outer diameter of the first plate 571 is equal to a length of a straight line which extends through the center axis AL between outer circumferential surfaces of the second interpolar auxiliary magnets 564 that are opposed to each other across the coupled rotation shaft 513.

The first locking claws 573 are respectively fitted into the positioning locking holes 537 formed in the non-opposed surface 531b of the first core base 531. Here, the first plate 571 abuts against a peripheral portion of the non-opposed surface 531b of the first core base 531, the second back surface auxiliary magnet 562, and outer surfaces of the first and second interpolar auxiliary magnets 563 and 564 close to the first core base 531.

A locking flange 574 extending in an opposite direction from the first locking claws 573 is formed on an outer peripheral end of the first plate 571.

The second plate 572 is formed to have an annular plate shape. An inner diameter of the second plate 572 is set to be equal to a diameter of a circle extending about the center axis AL, which extends through a center position of the four positioning locking holes 547 formed in the non-opposed surface 541b of the second core base 541. Four second locking claws 575 are formed on an inner peripheral edge of the second plate 572 at substantially equal intervals, and the second locking claws 575 extend toward the second rotor core 540. An outer diameter of the second plate 572 is equal to a length of a straight line that extends through the center axis AL between outer circumferential surfaces of the first interpolar auxiliary magnets 563 that are opposed to each other across the coupled rotation shaft 513.

The second locking claws 575 are respectively fitted into the positioning locking holes 547 formed in the non-opposed surface 541b of the second core base 541. Here, the second plate 572 abuts against a peripheral portion of the non-opposed surface 541b of the second core base 541, the first back surface auxiliary magnet 561, and outer surfaces of the first and second interpolar auxiliary magnets 563 and 564 closer to the second core base 541.

Eight fixing members 576 extending in the same direction as the second locking claws 575 are formed on outer peripheral edges of the second plate 572. The eight fixing members 576 are arranged so that when the second locking claws 575 of the second plate 572 are fitted into the positioning locking holes 547 of the second core base 541, the fixing members 576 are located between the first magnetic pole portions 534 of the first claw-shaped magnetic poles 532 and the second magnetic pole portions 544 of the second claw-shaped magnetic poles 542.

The fixing members 576 extend from basal end thereof toward the first plate 571 in the axial direction onto the locking flange 574 of the first plate 571. Here, a radially inner surface of each of the fixing members 576 covers an entire radial outer surface of the first interpolar auxiliary magnet 563 or the second interpolar auxiliary magnet 564 coupled between the first magnetic pole portion 534 of the first claw-shaped magnetic poles 532 and the second magnetic pole portion 544 of the second claw-shaped magnetic poles 542.

As shown in FIG. 44, a swaging claw 577 is arranged on a distal end of each of the fixing members 576. As shown in FIG. 43, the swaging claw 577 is swaged to be engaged with the locking flange 574 of the first plate 571, thereby connecting the first plate 571 and the second plate 572 to each other. Thus, the rotor cover 570 is coupled to the rotor 514. Although FIG. 44 shows when the swaging claw 577 is swaged, the swaging claw 577 extends along the axial direction (the direction of axis AL) before being swaged.

The operation of the fifth embodiment having the above-described structure will now be described.

In the brushless motor 510, if three-phase power supply voltage is applied to the three-phase windings 523u and 523v and 523w of the stator core 520 to form a rotating field in the stator 512, the rotor 514 fixed to the rotation shaft 513 located at the inner side of the stator 512 is rotated by the rotating field.

Both axial side surfaces of the rotor 514 are covered with the first plate 571 and the second plate 572 of the rotor cover 570. Hence, the first and second interpolar auxiliary magnets 563 and 564 and the first and second back surface auxiliary magnets 561 and 562 are limited from separating in the axial direction when the rotor 514 rotates. Further, the fixing members 576 of the rotor cover 570 press radial outer surfaces of the corresponding first and second interpolar auxiliary magnets 563 and 564. Hence, even if centrifugal forces caused by rotation of the rotor 514 are applied to the first and second interpolar auxiliary magnets 563 and 564, the first and second interpolar auxiliary magnets 563 and 564 are limited from separating from the first and second rotor cores 530 and 540.

In the rotor 514 of the fifth embodiment, the dividing grooves 552 are formed in the one side surface 550a of the field magnet 550. Thus, even if an uneven load is applied to the field magnet 550 and the field magnet 550 becomes cracked, the field magnet 550 easily becomes cracked at its intended portion along the dividing grooves 552. Here, the dividing grooves 552 are arranged at equal angular intervals in the circumferential direction, and the number of the dividing grooves 552 is same as that of pairs of poles. Hence, even if the field magnet 550 becomes cracked along the dividing groove 552, the number of the divided field magnets is same as the number of sets of the first claw-shaped magnetic pole 532 and the second claw-shaped magnetic pole 542 (four sets).

The advantages of the fifth embodiment will now be described.

(19) The dividing grooves 552 which are recessed in the axial direction and extend along the radial direction are formed in the axial one side surface 550a of the field magnet 550. Hence, when an uneven load is applied to the field magnet 550 and the field magnet 550 becomes cracked, it easily becomes cracked along the dividing grooves 552. Therefore, even if the field magnet 550 becomes cracked, magnetic flux can be generated evenly, and the field magnet 550 can sufficiently function. Hence, it is possible to limit decrease in yield.

(20) When the field magnet 550 is cracked, the field magnet 550 is divided along the dividing grooves 552 of the same number as that of pairs of poles. Hence, the field magnet 550 easily becomes cracked into the same number of pieces as the number of pairs of poles. Thus, it is possible to limit magnetic flux generated by the field magnet 550 from becoming uneven due to cracking of the field magnet 550.

(21) The dividing grooves 552 are formed at equal angular intervals in the circumferential direction. Hence, even if a load is applied to the field magnet 550 and it becomes cracked, it can be expected that it becomes cracked at equal angular intervals in the circumferential direction. Thus, each piece of the cracked field magnets 550 can have a substantially same volume.

The fifth embodiment may be changed as follows.

Figure 49:
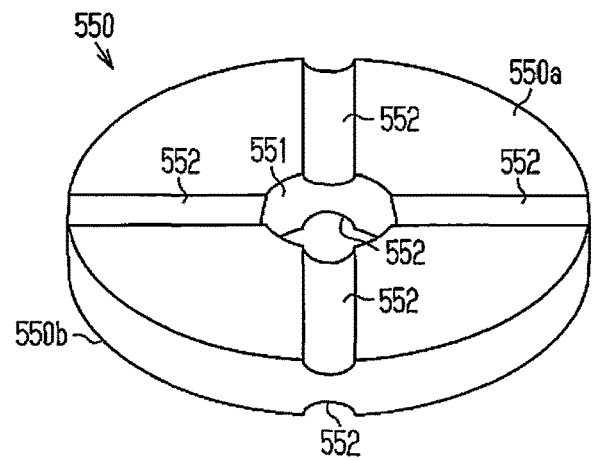
FIG. 49 is a perspective view of an annular magnet in another example of the fifth embodiment.
Figure 50:
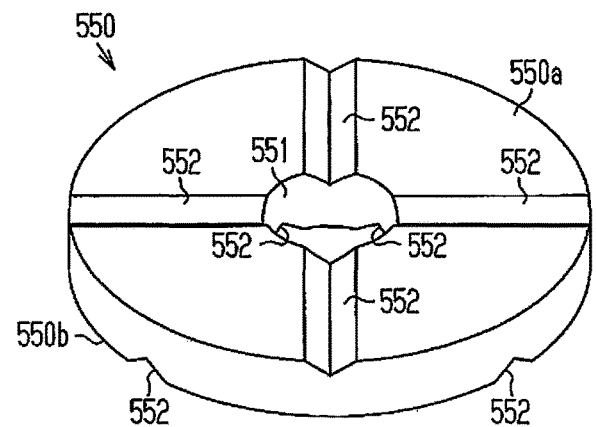
FIG. 50 is a perspective view of an annular magnet in another example of the fifth embodiment.
Figure 51:
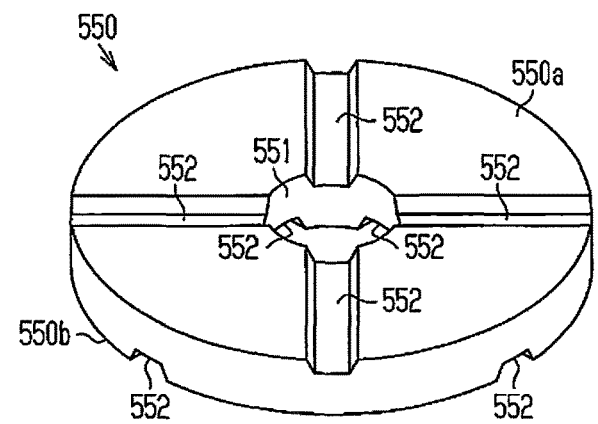
FIG. 51 is a perspective view of an annular magnet in another example of the fifth embodiment.

Although the dividing grooves 552 are formed in the axial one side surface 550a of the field magnet 550 in the fifth embodiment, the present invention is not limited to this. The dividing grooves 552 may be formed in both axial side surfaces 550a and 550b as shown in FIGS. 49 to 51. In FIG. 49, dividing grooves 552 in the axial one side surface 550a and dividing grooves 552 in the axial other side surface 550b are formed substantially at the same positions in the circumferential direction of the magnet 550 so that they are overlapped with each other as viewed in the axial direction. However, it is not absolutely necessary that the dividing grooves 552 in the one side surface 550a and the dividing grooves 552 in the other side surface 550b are formed at the same positions in the circumferential direction of the magnet 550. As shown in FIGS. 50 and 51 for example, the dividing grooves 552 in the other side surface 550b may be formed at positions deviated from the dividing grooves 552 of the one side surface 550a through 360° in the circumferential direction/the number of magnetic poles (=360°/8=45°). Thus configuration, among the dividing grooves 552, ones provided in the one side surface 550a and ones provided in the other side surface 550b are alternately arranged in the circumferential direction. Hence, unevenness in magnetic flux with respect to north pole and south pole can more reliably be suppressed.

Although a cross-section of the dividing groove 552 orthogonal to the axial direction has a semi-circular or semi-elliptical shape in the fifth embodiment, the cross-sectional shape is not limited to this. As shown in FIGS. 50 and 51 for example, the cross-section of the dividing groove 552 orthogonal to the axial direction may be a triangular shape or a trapezoidal shape.

Although it is not especially mentioned in the fifth embodiment and the various modifications, the dividing grooves 552 may be chamfered (such as by R-chamfering process or C-chamfering process) so that the dividing grooves 552 do not have acute angles.

Figure 52:
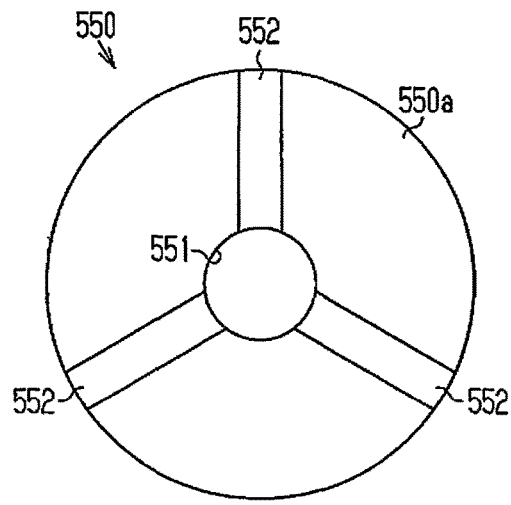
FIG. 52 is a plan view of an annular magnet in another example of the fifth embodiment.

In the fifth embodiment, four dividing grooves 552 are formed in the one side surface 550a of the field magnet 550, but the number of the dividing grooves 552 is not limited to four. As shown in FIG. 52 for example, three dividing grooves 552 may be formed in the field magnet 550. Thus configuration, when the field magnet 550 is to become cracked, it is divided along the three dividing grooves 552. Thus, the rotor cores 530 and 540 and surfaces of the three field magnets 550 come into contact with each other in the axial direction. Hence, the assembled state of the rotor cores 530 and 540 and the field magnets 550 can be stabilized.

The interpolar auxiliary magnets 563 and 564 and the back surface auxiliary magnets 561 and 562 are provided in the rotor 514 in the fifth embodiment. The present invention is not limited to this, and any one or both of the interpolar auxiliary magnets 563 and 564 and the back surface auxiliary magnets 561 and 562 may be omitted.

In the fifth embodiment, the first auxiliary grooves 535 and 545 and the second auxiliary grooves 536 and 546 are formed in the radial outer surfaces f1 and f2 of the first and second magnetic pole portions 534 and 544. The present invention is not limited to this, and the radial outer surfaces f1 and f2 of the first and second magnetic pole portions 534 and 544 may not have the first auxiliary grooves 535 and 545 and the second auxiliary grooves 536 and 546 formed therein.

Although the rotor 514 is provided with the rotor cover 570 in the fifth embodiment, the rotor cover 570 may be omitted.

Figure 53:
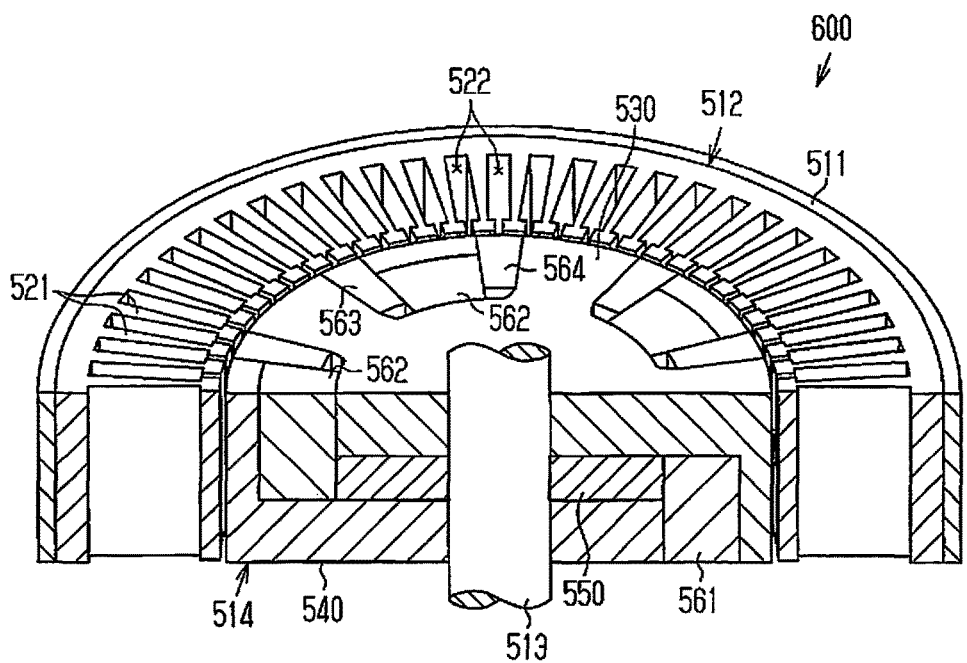
FIG. 53 is a partially cut-away perspective view of a brushless motor in another example of the fifth embodiment.

In the fifth embodiment, the motor 510 includes the rotor 514 with eight poles (the number of pairs of poles is four), and the stator 512 having 12 slots and configured by concentrated winding. The motor is not limited to this, and a motor 600 shown in FIG. 53 may be employed. The motor 600 includes a rotor 514 with 10 poles, and a stator 512 with 60 teeth 521 and 60 slots 522. Since FIG. 53 shows the stator 512 and the rotor 514 in a sectional perspective view, half of the actual number of both the slots and the poles are shown. Although it is not especially shown in FIG. 53, windings may be configured by inserting wire material (a segment conductor) having a substantially rectangular cross-section into the slots of the stator 512 and welding the wire material. Thus configuration, the space factor of the windings can be enhanced by effectively utilizing the substantially rectangular slots 522.

The invention claimed is:

1. A rotor comprising:
   a rotation shaft;
   a first rotor core including a substantially disk-shaped first core base and a plurality of first claw-shaped magnetic poles arranged at equal intervals on a peripheral portion of the first core base, wherein each of the first claw-shaped magnetic poles projects outward in the radial direction and extends in the axial direction;
   a second rotor core including a substantially disk-shaped second core base and a plurality of second claw-shaped magnetic poles arranged at equal intervals on a peripheral portion of the second core base, wherein each of the second claw-shaped magnetic poles projects outward in the radial direction and extends in the axial direction, and the first rotor core and the second rotor core are combined with each other so that the first and second core bases are opposed to each other and the first and second claw-shaped magnetic poles are alternately arranged in the circumferential direction;
   a hard main field magnet located between the first and second core bases in the axial direction and is magnetized in the axial direction, and the hard main field magnet causes the first claw-shaped magnetic poles to function as first magnetic poles and causes the second claw-shaped magnetic poles to function as second magnetic poles; and
   an elastic member held in the axial direction between the hard main field magnet and one of the first core base and the second core base, the elastic member having the same shape as the hard main field magnet as viewed in the axial direction, wherein
   the first rotor core, the second rotor core, the hard main field magnet and the elastic member each includes a central hole for an insertion of the rotation shaft, and the central holes are arranged in a coaxial manner.

2. The rotor according to claim 1, wherein the elastic member is an elastic magnetic body.

3. The rotor according to claim 2, wherein the elastic member is an elastic magnet magnetized in the axial direction.

4. The rotor according to claim 1, wherein the elastic member is one of two elastic members, one arranged between the hard main field magnet and the first core base in the axial direction and one arranged between the hard main field magnet and the second core base in the axial direction.

5. A motor including the rotor according to claim 1 and a stator for generating a rotating field.

\* \* \* \* \*